(12) United States Patent
Mitsuhashi et al.

(10) Patent No.: US 12,090,814 B2
(45) Date of Patent: Sep. 17, 2024

(54) VEHICLE HEAT EXCHANGE SYSTEM

(71) Applicant: DENSO CORPORATION, Kariya (JP)

(72) Inventors: Takuya Mitsuhashi, Kariya (JP); Basmil Yenerdag, Kariya (JP); Kouta Majima, Kariya (JP)

(73) Assignee: DENSO CORPORATION, Kariya (JP)

( * ) Notice: Subject to any disclaimer, the term of this patent is extended or adjusted under 35 U.S.C. 154(b) by 396 days.

(21) Appl. No.: 17/683,657

(22) Filed: Mar. 1, 2022

(65) Prior Publication Data

US 2022/0266656 A1 Aug. 25, 2022

Related U.S. Application Data

(63) Continuation of application No. PCT/JP2020/032808, filed on Aug. 31, 2020.

(30) Foreign Application Priority Data

Sep. 10, 2019 (JP) ................................ 2019-164242

(51) Int. Cl.
*B60H 1/00* (2006.01)
(52) U.S. Cl.
CPC ................................ *B60H 1/00914* (2013.01)
(58) Field of Classification Search
None
See application file for complete search history.

(56) References Cited

U.S. PATENT DOCUMENTS

| 5,138,843 | A | * | 8/1992 | Tamayama | ............ F25B 47/02 62/82 |
| 6,834,511 | B2 | * | 12/2004 | Hatakeyama | ...... B60H 1/00849 62/159 |
| 7,228,707 | B2 | * | 6/2007 | Lifson | ...................... F25B 5/00 62/513 |

(Continued)

FOREIGN PATENT DOCUMENTS

| CN | 102059932 A | * | 5/2011 | ......... B60H 1/00278 |
| DE | 102006008021 A1 | * | 8/2006 | ......... B60H 1/00378 |

(Continued)

*Primary Examiner* — Jenna M Maroney
(74) *Attorney, Agent, or Firm* — Harness, Dickey & Pierce, P.L.C.

(57) ABSTRACT

A vehicle heat exchange system includes a cooling heat exchanger provided in a cooling water circuit, a first air-conditioning heat exchanger as an evaporator in a heat pump system, a hydrothermal-medium heat exchanger as a refrigerant condenser in the heat pump system, a second air-conditioning heat exchanger, and an air conditioning passage in which the first air-conditioning heat exchanger and the second air-conditioning heat exchanger are disposed. A vehicle interior-exterior communication port is provided at a downstream side of the second air-conditioning heat exchanger in the air conditioning passage, to guide the air having passed through the second air-conditioning heat exchanger, to an outside of the vehicle interior. The cooling water for cooling the heating element flows through the second air-conditioning heat exchanger, and the air having passed through the second air-conditioning heat exchanger is discharged outside the vehicle interior through the vehicle interior-exterior communication port.

6 Claims, 23 Drawing Sheets

(56) References Cited

U.S. PATENT DOCUMENTS

| | | | |
|---|---|---|---|
| 9,821,625 B2 * | 11/2017 | Graaf | B60H 1/0005 |
| 10,406,885 B2 * | 9/2019 | Rippel | B60H 1/00021 |
| 11,117,447 B2 * | 9/2021 | Lee | B60H 1/00271 |
| 11,833,887 B2 * | 12/2023 | Kawano | B60H 1/00278 |
| 2002/0095943 A1 * | 7/2002 | Hatakeyama | B60H 1/00914 62/324.1 |
| 2005/0178523 A1 * | 8/2005 | Itoh | B60H 1/00385 165/42 |
| 2007/0157647 A1 * | 7/2007 | Duhme | B60L 58/26 62/185 |
| 2009/0193830 A1 * | 8/2009 | Yoshioka | B60H 1/00899 62/239 |
| 2009/0293512 A1 * | 12/2009 | Miura | B60H 1/02 180/311 |
| 2013/0042637 A1 * | 2/2013 | Richter | B60H 1/00514 62/79 |
| 2013/0299129 A1 * | 11/2013 | Osaka | B60H 1/32281 165/59 |
| 2014/0154965 A1 * | 6/2014 | Han | B60H 1/248 454/162 |
| 2016/0082809 A1 * | 3/2016 | Wang | B60H 1/248 454/145 |
| 2016/0339767 A1 * | 11/2016 | Enomoto | B60H 1/00864 |
| 2017/0087956 A1 * | 3/2017 | Graaf | B60H 1/00921 |
| 2017/0166031 A1 * | 6/2017 | Shin | B60H 1/00921 |
| 2017/0167776 A1 * | 6/2017 | Shin | B60H 1/00899 |
| 2017/0299232 A1 * | 10/2017 | Richter | B60H 1/00057 |
| 2018/0001737 A1 * | 1/2018 | Graaf | H01M 10/663 |
| 2018/0065444 A1 * | 3/2018 | Allgaeuer | B60H 1/00899 |
| 2018/0093548 A1 * | 4/2018 | Ceperkovic | B60H 1/00921 |
| 2018/0202697 A1 * | 7/2018 | Huenemoerder | B60H 1/00907 |
| 2018/0259240 A1 * | 9/2018 | Onishi | F25D 21/006 |
| 2018/0312028 A1 * | 11/2018 | Rippel | B60H 1/00464 |
| 2020/0189357 A1 * | 6/2020 | Chopard | B60H 1/00499 |
| 2021/0300155 A1 * | 9/2021 | Kanou | B60H 1/00878 |
| 2022/0266656 A1 * | 8/2022 | Mitsuhashi | B60H 1/00914 |

FOREIGN PATENT DOCUMENTS

| | | | | |
|---|---|---|---|---|
| DE | 102013106209 A1 * | 3/2014 | | B60H 1/00007 |
| DE | 112017005756 T5 * | 8/2019 | | B60H 1/00278 |
| FR | 2814400 A1 * | 3/2002 | | B60H 1/3233 |
| JP | H05147428 A * | 6/1993 | | |
| JP | H05155233 A * | 6/1993 | | |
| JP | 2004352085 A * | 12/2004 | | |
| JP | 2008273222 A | 11/2008 | | |
| JP | 6218953 B2 | 10/2017 | | |
| JP | 2018008541 A | 1/2018 | | |
| JP | 6298537 B2 | 3/2018 | | |
| JP | 2018151127 A | 9/2018 | | |
| JP | 2020104670 A * | 7/2020 | | B60H 1/00278 |
| KR | 20140072736 A * | 6/2014 | | |
| KR | 101703604 B1 * | 2/2017 | | |
| WO | WO-2012114447 A1 | 8/2012 | | |
| WO | WO-2016064236 A1 * | 4/2016 | | B60H 1/00007 |
| WO | WO-2016114448 A1 * | 7/2016 | | B60H 1/00007 |
| WO | WO-2019065013 A1 * | 4/2019 | | B60H 1/32 |
| WO | WO-2020026634 A1 * | 2/2020 | | B60H 1/00057 |
| WO | WO-2020137233 A1 * | 7/2020 | | B60H 1/00278 |
| WO | WO-2021049339 A1 * | 3/2021 | | |
| WO | WO-2022158153 A1 * | 7/2022 | | B60H 1/00278 |

* cited by examiner

VEHICLE HEAT EXCHANGE SYSTEM

CROSS REFERENCE TO RELATED APPLICATION

The present application is a continuation application of International Patent Application No. PCT/JP2020/032808 filed on Aug. 31, 2020, which designated the U.S. and claims the benefit of priority from Japanese Patent Applications No. 2019-164242 filed on Sep. 10, 2019. The entire disclosures of all of the above applications are incorporated herein by reference.

TECHNICAL FIELD

The present disclosure relates to a vehicle heat exchange system.

BACKGROUND

A heat exchange system includes a radiator and an outdoor heat exchanger which are configured to exchange heat with outside air that is air outside a vehicle interior. The radiator cools cooling water of an internal combustion engine flowing through the inside of the radiator by exchanging heat between the cooling water and the outside air. The outdoor heat exchanger functions as a so-called condenser that cools and condenses a thermal medium flowing through the inside of the outdoor heat exchanger by exchanging heat between the thermal medium and the outside air. The outdoor heat exchanger is a component of a refrigeration cycle of a vehicle air conditioner. The refrigeration cycle is made of the outdoor heat exchanger, a compressor, an expansion valve, and an evaporator. In the air conditioner, air (i.e., air-conditioning air) for air-conditioning the vehicle interior is cooled by exchanging heat between the air-conditioning air and the evaporator. The air conditioner is also provided with a heater core that heats the air-conditioning air by using the cooling water of the internal combustion engine as a heat source. In the air conditioner, the air-conditioning air cooled by the evaporator is blown into the vehicle interior to cool and dehumidify the vehicle interior, and the air-conditioning air heated by the heater core is blown into the vehicle interior to heat the vehicle interior.

SUMMARY

According to an aspect of the present disclosure, a vehicle heat exchange system includes a cooling heat exchanger provided in a cooling water circuit in which cooling water for cooling a heating element of a vehicle circulates, a first air-conditioning heat exchanger configured to operate as an evaporator in a heat pump system, a first hydrothermal-medium heat exchanger configured to operate as a refrigerant condenser in the heat pump system, a second air-conditioning heat exchanger in which the cooling water, which has absorbed heat of the thermal medium in the first hydrothermal-medium heat exchanger, flows, a second hydrothermal-medium heat exchanger configured to heat the thermal medium by exchanging heat between the cooling water for cooling the heating element and the thermal medium circulating in the heat pump system, and an air conditioning passage in which the first air-conditioning heat exchanger and the second air-conditioning heat exchanger are disposed. The air conditioning passage is configured to guide the air, which has passed through the first air-conditioning heat exchanger and the second air-conditioning heat exchanger, into the vehicle interior. A vehicle interior-exterior communication port is provided at a downstream side of the second air-conditioning heat exchanger in the air conditioning passage, to guide the air, which has passed through the second air-conditioning heat exchanger, to an outside of the vehicle interior. The cooling water circuit is configured to cause the cooling water for cooling the heating element to flow through the second air-conditioning heat exchanger, and the vehicle interior-exterior communication port is configured to cause the air that has passed through the second air-conditioning heat exchanger to be discharged outside the vehicle interior through the vehicle interior-exterior communication port. In addition, the cooling water circuit may be configured to cause the cooling water, which has absorbed the heat of the thermal medium in the first hydrothermal-medium heat exchanger to flow through the second air-conditioning heat exchanger when the first air-conditioning heat exchanger is not operating as an evaporator and the second hydrothermal-medium heat exchanger is operating as an evaporator in the heat pump system.

BRIEF DESCRIPTION OF THE DRAWINGS

The above and other objects, features and advantages of the present disclosure will become more apparent from the following detailed description made with reference to the accompanying drawings.

DESCRIPTION OF EMBODIMENTS

Figure 1:
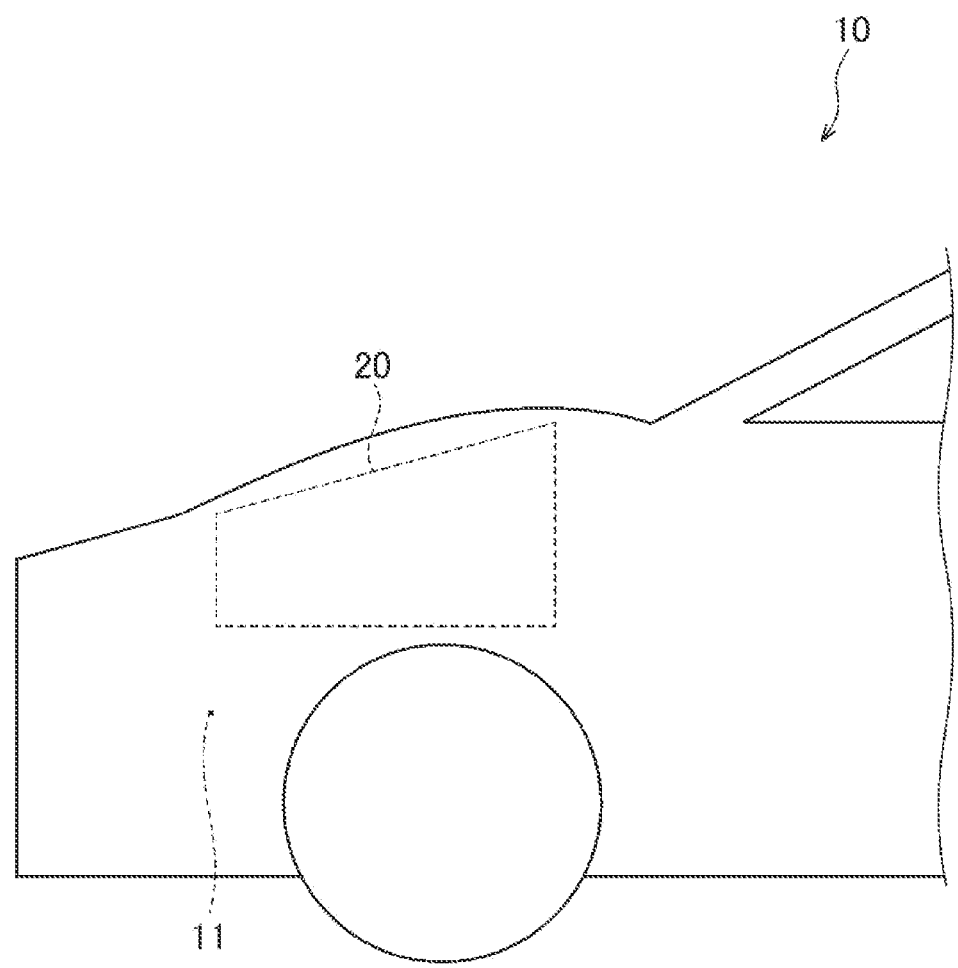
FIG. 1 is a diagram schematically illustrating a structure of a vehicle of an embodiment.

In a heat exchange system, a heat pump cycle capable of cooling and heating air-conditioning air may be used in an air conditioner, instead of a refrigeration cycle that only cools the air-conditioning air. In the heat pump cycle, when the air-conditioning air is heated, an indoor heat exchanger is driven as an evaporator. The heat pump cycle is also provided with a hydrothermal medium heat exchanger that exchanges heat between high-temperature and high-pressure thermal medium compressed by a compressor and cooling water. In the hydrothermal medium heat exchange, the cooling water that has absorbed the heat of the thermal medium flows through a heater core, so that the air-conditioning air can be heated in the heater core.

In a vehicle heat exchange system with an internal combustion engine, a heater core may be not used, for example, in a case where the internal combustion engine is cooled and the vehicle interior is cooled. If the heat of the cooling water of the internal combustion engine can be dissipated in the heater core in this case, a radiator for the cooling water of the internal combustion engine can be simplified.

The inventors of the present application deeply studied the improvement in coordination between the configuration for cooling the cooling water of the internal combustion engine and the configuration for air-conditioning the vehicle interior, in order to provide a vehicle heat exchange system in which configuration can be simplified while the configuration is capable of cooling a heating element and air-conditioning a vehicle interior.

According to an exemplar embodiment of the present disclosure, a vehicle heat exchange system includes: a cooling heat exchanger provided in a cooling water circuit in which cooling water for cooling a heating element of a vehicle circulates, and configured to exchange heat between air flowing through a cooling passage and the cooling water; a first air-conditioning heat exchanger configured to operate as an evaporator in a heat pump system, and configured to cool air for air conditioning a vehicle interior by exchanging heat between the air and a thermal medium circulating in the heat pump system; a first hydrothermal-medium heat exchanger configured to operate as a refrigerant condenser in the heat pump system, and configured to cool the thermal medium by exchanging heat between the thermal medium circulating in the heat pump system and the cooling water; a second air-conditioning heat exchanger in which the cooling water, which has absorbed heat of the thermal medium in the first hydrothermal-medium heat exchanger, flows, the second air-conditioning heat exchanger being configured to heat the air by exchanging heat between the cooling water and the air; a second hydrothermal-medium heat exchanger configured to heat the thermal medium by exchanging heat between the cooling water for cooling the heating element and the thermal medium circulating in the heat pump system; an air conditioning passage in which the first air-conditioning heat exchanger and the second air-conditioning heat exchanger are disposed, the air conditioning passage being configured to guide the air, which has passed through the first air-conditioning heat exchanger and the second air-conditioning heat exchanger, into the vehicle interior; and a vehicle interior-exterior communication port provided at a downstream side of the second air-conditioning heat exchanger in the air conditioning passage, to guide the air, which has passed through the second air-conditioning heat exchanger, to an outside of the vehicle interior. The cooling water circuit is configured to cause the cooling water for cooling the heating element to flow through the second air-conditioning heat exchanger, and the vehicle interior-exterior communication port is configured to cause the air that has passed through the second air-conditioning heat exchanger to be discharged outside the vehicle interior through the vehicle interior-exterior communication port. In addition, the cooling water circuit is configured to cause the cooling water, which has absorbed the heat of the thermal medium in the first hydrothermal-medium heat exchanger to flow through the second air-conditioning heat exchanger when the first air-conditioning heat exchanger is not operating as an evaporator and the second hydrothermal-medium heat exchanger is operating as an evaporator in the heat pump system.

According to this configuration, while the first air-conditioning heat exchanger is operating as an evaporator, the cooling water for cooling the heating element flows not only through the cooling heat exchanger but also through the second air-conditioning heat exchanger. As a result, the heat of the cooling water can be dissipated in both the cooling heat exchanger and the second air-conditioning heat exchanger. That is, both the cooling heat exchanger and the second air-conditioning heat exchanger function as a radiator. As a result, the amount of heat dissipation required in the cooling heat exchanger can be reduced as compared with a case where the heat of the cooling water is dissipated only in the cooling heat exchanger, so that the cooling heat exchanger can be simplified, such as downsizing the cooling heat exchanger and reducing the number of heat exchange parts in the cooling heat exchanger. In addition, the air-conditioning air can be heated and cooled in the first air-conditioning heat exchanger and the second air-conditioning heat exchanger, so that the vehicle interior can be air-conditioned. Furthermore, the heating element can be cooled by the cooling water flowing through the cooling heat exchanger, and the air that has exchanged heat with the cooling water in the second air-conditioning heat exchanger is discharged outside the vehicle interior through the vehicle interior-exterior communication port. As a result, the air to be discharged outside the vehicle interior can also be suppressed from affecting the air conditioning of the vehicle interior.

For example, the vehicle heat exchange system may further include a frosted-state detector configured to detect a frosted state of the cooling heat exchanger. In this case, the heat pump system may be configured to switch a first state in which the first air-conditioning heat exchanger is operated as an evaporator and a second state in which the second hydrothermal-medium heat exchanger is operated as an evaporator, depending on the frosted state of the cooling heat exchanger. When the first air-conditioning heat exchanger is operating as an evaporator, the first hydrothermal-medium heat exchanger may operate as a refrigerant condenser, so that the cooling water, which has absorbed the heat of the thermal medium in the first hydrothermal-medium heat exchanger, flows through the second air-conditioning heat exchanger, and the cooling water circulates between the heating element and the cooling heat exchanger.

The vehicle heat exchange system may further include a cooling-side outside air inlet configured to introduce outside air, air outside the vehicle, into the cooling passage, at an upstream side of the cooling heat exchanger in the cooling passage. In this case, the vehicle interior-exterior communication port may be used as an air-conditioning-side vehicle interior-exterior communication port provided in the air conditioning passage. The cooling passage may be provided respectively with a first cooling-side communication port communicating with the outside of the vehicle interior, and a second cooling-side communication port communicating with the vehicle interior, at a downstream side of the cooling heat exchanger. In addition, the cooling passage may be provided with a blower rotatable with a first rotation direction to blow an air flow flowing from the cooling-side outside air inlet toward the first cooling-side communication port in a first mode, and the blower may be rotatable with a second rotation direction opposite with the first rotation direction, to introduce inside air, inside of the vehicle interior, into the cooling passage from the second cooling-side communication port in a second mode.

The vehicle heat exchange system may include a first opening-closing unit configured to open and close the cooling-side outside air inlet, and a second opening-closing unit configured to open and close the cooling-side first communication port.

For example, in the second mode, the inside air introduced into the cooling passage from the second cooling-side communication port passes through the cooling heat exchanger, and then flows through the second air-conditioning heat exchanger. Alternatively, in the second mode, the inside air introduced into the cooling passage from the second cooling-side communication port passes through the cooling heat exchanger, and then is discharged outside the vehicle interior.

Hereinafter, multiple embodiments for performing the present disclosure will be described with reference to the drawings. In each embodiment, portions corresponding to those described in the preceding embodiment are denoted by the same reference numerals, and overlapping descriptions may be omitted. In a case where only a part of a configuration is described in each embodiment, the other embodiments described above are capable of being applied for the other parts of the configuration. Not only a combination of parts that clearly indicate that the combination is possible in each embodiment, but also a partial combination of embodiments even if the combination is not specified is also possible when there is no problem in the combination.

As illustrated in FIG. 1, a heat exchange module 20 of the present embodiment is disposed in an upper portion of a hood 11 of a vehicle 10. The vehicle 10 of the present embodiment is a so-called electric vehicle that runs on the power of a motor generator. Therefore, the vehicle includes a battery that supplies power to the motor generator, an inverter device that converts the DC power charged in the battery into AC power, and the like. The running wind of the vehicle 10 is introduced into the heat exchange module 20 as outside air. The heat exchange module 20 has a function as a radiator that dissipates the heat of cooling water for cooling the battery, the inverter device, and the like, and has a function as a heat exchanger that generates air-conditioning air for air conditioning a vehicle interior.

Next, a specific configuration of the heat exchange module 20 will be described.

Figure 2:
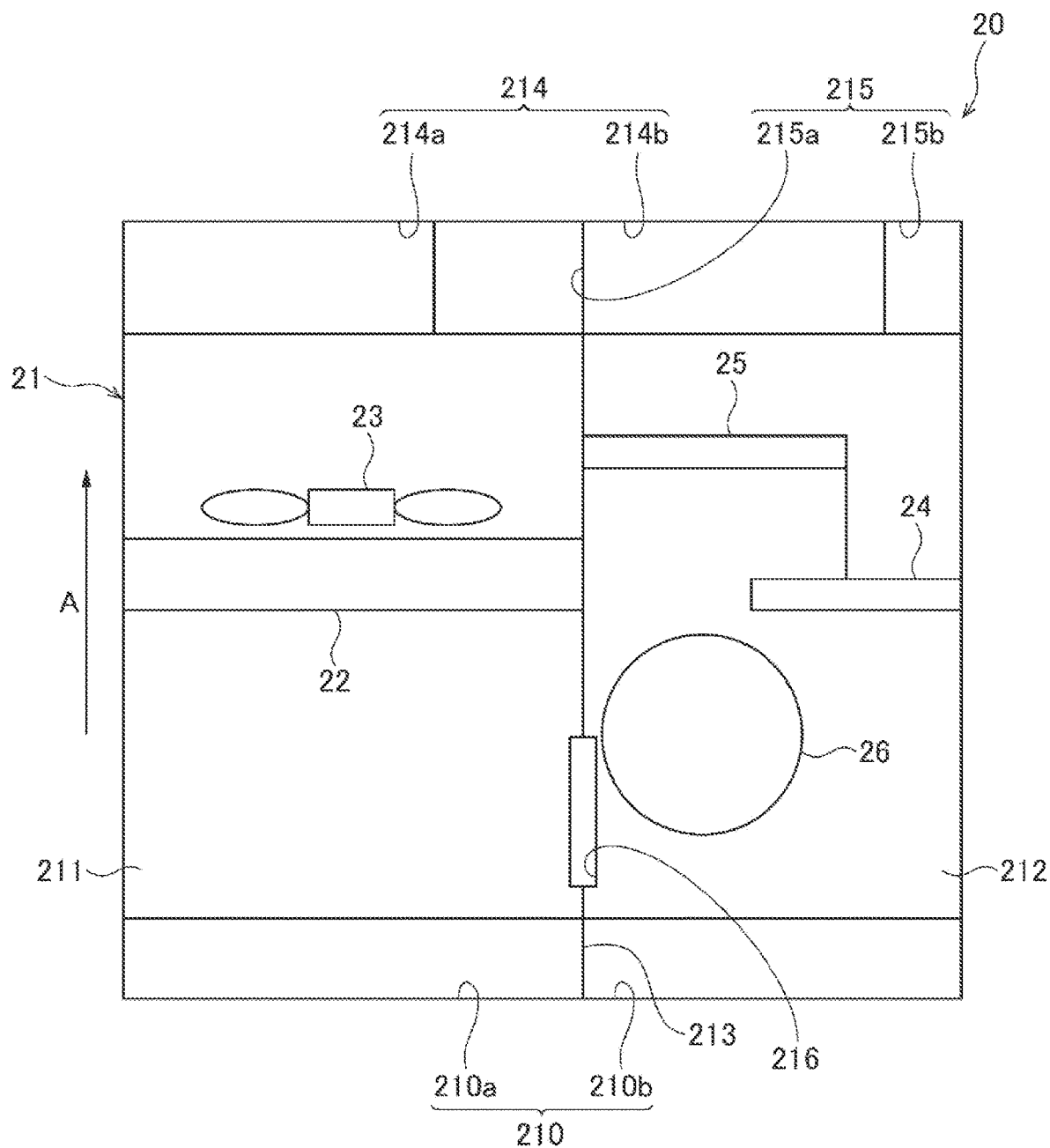
FIG. 2 is a diagram schematically illustrating a structure of a heat exchange module of an embodiment.

As illustrated in FIG. 2, the heat exchange module 20 includes a case 21, a cooling heat exchanger 22, a first blower 23, a first air-conditioning heat exchanger 24, a second air-conditioning heat exchanger 25, and a second blower 26. Note that the direction indicated by the arrow A in the diagram indicates an outside air flow direction.

At one end, on the upstream side of the outside air flow direction A, of the case 21, an outside air inlet 210 for introducing outside air from the hood 11 of the vehicle 10 is formed. In the case 21, a partition wall 213 that partitions the space inside the case 21 into a cooling passage 211 and an air conditioning passage 212. The outside air introduced from the outside air inlet 210 is introduced into each of the cooling passage 211 and the air conditioning passage 212. At the other end, on the downstream side of the outside air flow direction A, of the case 21, a vehicle interior-exterior communication port 214 that makes the cooling passage 211 and the air conditioning passage 212 communicate with the outside of the vehicle interior, and a vehicle interior-interior communication port 215 that makes the cooling passage 211 and the air conditioning passage 212 communicate with the inside of the vehicle interior, are formed. The case 21 houses the cooling heat exchanger 22, the air-conditioning heat exchangers 24, 25, and the blowers 23, 26.

Note that in the following, a portion of the outside air inlet 210 that is made to communicate with the cooling passage 211 is called a "cooling-side outside air inlet 210a", and a portion that is made to communicate with the air conditioning passage 212 is called an "air-conditioning-side outside air inlet 210b", for convenience. In addition, a portion of the vehicle interior-exterior communication port 214 that is made to communicate with the cooling passage 211 is called a "cooling-side vehicle interior-exterior communication port 214a", and a portion that is made to communicate with the air conditioning passage 212 is called an "air-conditioning-side vehicle interior-exterior communication port 214b". Furthermore, a portion of the vehicle interior-interior communication port 215 that is made to communicate with the cooling passage 211 is called a "cooling-side vehicle interior-interior communication port 215a", and a portion that is made to communicate with the air conditioning passage 212 is called an "air-conditioning-side vehicle interior-interior communication port 215b".

On the partition wall 213, a communication passage 216, which communicates an upstream portion of the cooling passage 211 with an upstream portion of the air conditioning passage 212, is formed. The communication passage 216 makes it possible to circulate air between the cooling passage 211 and the air conditioning passage 212.

The cooling heat exchanger 22 and the first blower 23 are disposed in the cooling passage 211. The first blower 23 is disposed on the downstream side, in the outside air flow direction A, of the cooling heat exchanger 22. The first blower 23 is an axial blower that blows the air-conditioning air flowing through the cooling passage 211 to the cooling heat exchanger 22. Note that the first blower 23 is not limited to an axial blower and any blower can be used. Cooling water flows inside the cooling heat exchanger 22. This cooling water cools heating elements, such as the motor generator, battery, and inverter device of the vehicle 10, by circulating among them. The cooling heat exchanger 22 mainly functions as a so-called radiator that cools the cooling water flowing through the inside of the radiator, by dissipating the heat of the cooling water with the heat exchange between the cooling water and the air-conditioning air flowing through the outside of the radiator.

The first air-conditioning heat exchanger 24, the second air-conditioning heat exchanger 25, and the second blower 26 are disposed in the air conditioning passage 212. The second blower 26 is, for example, a sirocco fan, and blows the air-conditioning air flowing through the air conditioning passage 212 to the first air-conditioning heat exchanger 24 and the second air-conditioning heat exchanger 25. The first air-conditioning heat exchanger 24 and the second air-conditioning heat exchanger 25 are disposed on the downstream side, in the outside air flow direction A, of the second blower 26. A thermal medium for a heat pump cycle used in the air conditioner of the vehicle 10 flows through the first air-conditioning heat exchanger 24 and the second air-conditioning heat exchanger 25. The first air-conditioning heat exchanger 24 mainly functions as a so-called evaporator that cools the air-conditioning air by exchanging heat between the thermal medium flowing through the inside of the first air-conditioning heat exchanger 24 and the air-conditioning air flowing through the outside thereof. The second air-conditioning heat exchanger 25 is disposed on the downstream side, in the outside air flow direction A, of the first air-conditioning heat exchanger 24. The second air-conditioning heat exchanger 25 mainly functions as a so-called heater core that heats the air-conditioning air by exchanging heat between the thermal medium flowing through the inside of the second air-conditioning heat exchanger 25 and the air-conditioning air flowing through the outside thereof. The air conditioning passage 212 guides the air, which has passed through the first air-conditioning heat exchanger 24 and the second air-conditioning heat exchanger 25, into the vehicle interior through the air-conditioning-side vehicle interior-interior communication port 215*b*.

Next, a heat exchange system 30 in which the heat exchange module 20 is used will be described in detail with reference to FIG. 3.

Figure 3:
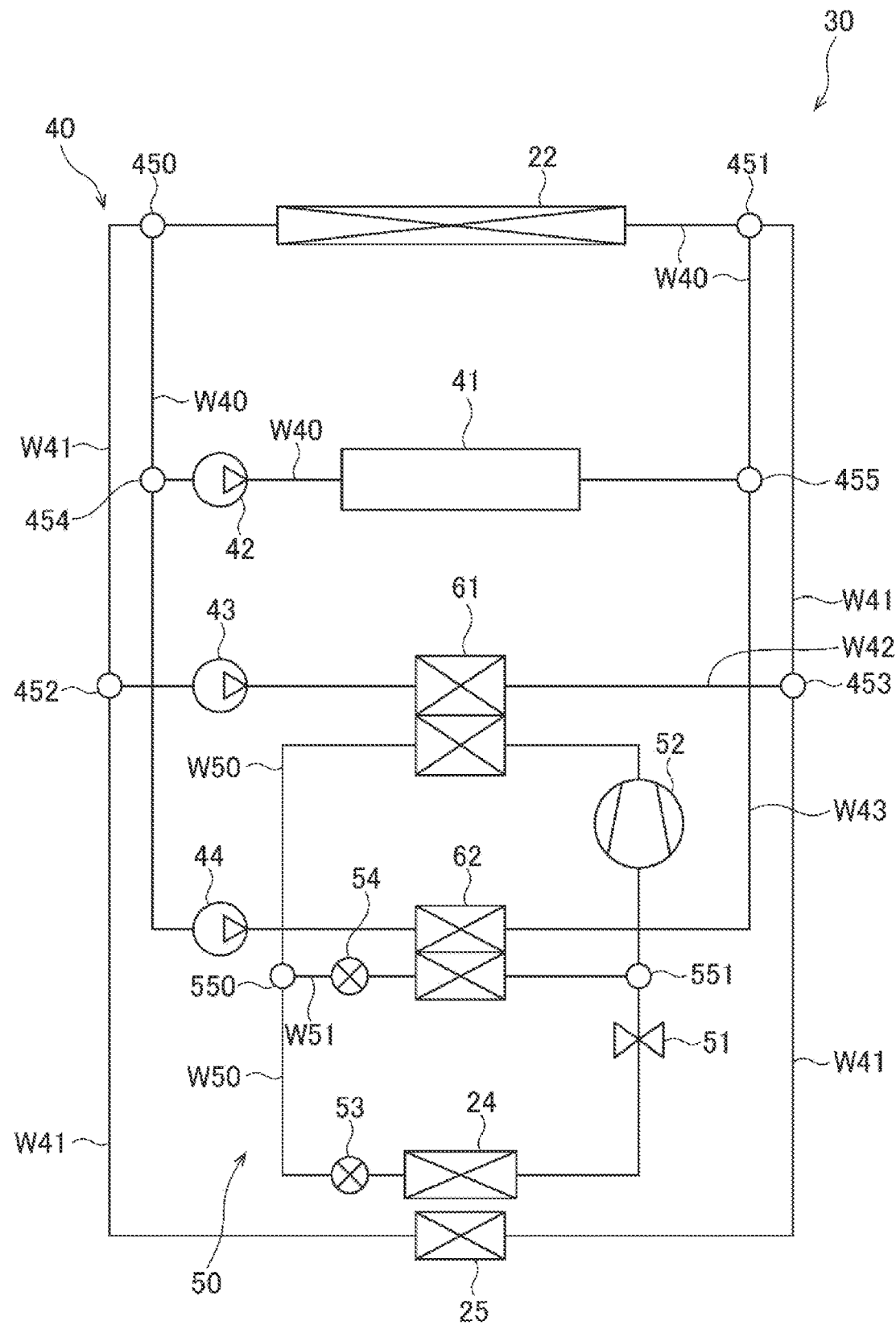
FIG. 3 is a block diagram illustrating a schematic configuration of a heat exchange system of an embodiment.

When the motor generator, battery, inverter device, and the like of the vehicle 10 are assumed to be a heating element 41, the heat exchange system 30 includes a cooling system 40 that cools the heating element 41 and a heat pump system 50 to be used in the air conditioner of the vehicle 10, as illustrated in FIG. 3.

The cooling system 40 has a structure in which the heating element 41, a first hydrothermal-medium heat exchanger 61, and the second air-conditioning heat exchanger 25 of the heat exchange module 20 illustrated in FIG. 2 are connected in parallel to the cooling heat exchanger 22 of the heat exchange module 20 illustrated in FIG. 2. In the cooling system 40, the cooling water circulates among the cooling heat exchanger 22, the heating element 41, the first hydrothermal-medium heat exchanger 61, and the second air-conditioning heat exchanger 25.

Specifically, the cooling heat exchanger 22 and the heating element 41 are connected by a ring-shaped flow path W40. A pump 42 is provided on the upstream side of the heating element 41 in the ring-shaped flow path W40. The pump 42 circulates the cooling water in the ring-shaped flow path W40 by sucking and pumping the cooling water flowing through the ring-shaped flow path W40.

The cooling system 40 is provided with a first bypass flow path W41 so as to connect an upstream portion and downstream portion of the cooling heat exchanger 22 in the ring-shaped flow path W40. The second air-conditioning heat exchanger 25 is disposed in the first bypass flow path W41. The second air-conditioning heat exchanger 25 is connected in parallel to the heating element 41 by the first bypass flow path W41. At two connection portions between the ring-shaped flow path W40 and the first bypass flow path W41, switching valves 450, 451, such as three-way valves for switching the connection states between the flow paths W40, W41, are respectively provided.

The cooling system 40 is provided with a second bypass flow path W42 so as to connect an upstream portion and downstream portion of the second air-conditioning heat exchanger 25 in the first bypass flow path W41. The second bypass flow path W42 is provided with the first hydrothermal-medium heat exchanger 61. The first hydrothermal-medium heat exchanger 61 is connected in parallel to the heating element 41 and the second air-conditioning heat exchanger 25 by the second bypass flow path W42. The first hydrothermal-medium heat exchanger 61 is a portion that exchanges heat between the cooling water circulating in the cooling system 40 and the thermal medium circulating in the heat pump system 50. A pump 43 is provided in the second bypass flow path W42. The pump 43 circulates the cooling water through the second bypass flow path W42 by sucking and pumping the cooling water flowing through the second bypass flow path W42. At two connection portions between the first bypass flow path W41 and the second bypass flow path W42, switching valves 452, 453, such as three-way valves for switching the connection states between the flow paths W41, W42, are respectively provided.

The cooling system 40 is provided with a third bypass flow path W43 so as to connect an upstream portion of the pump 42 and a downstream portion of the heating element 41 in the ring-shaped flow path W40. A pump 44 and a second hydrothermal-medium heat exchanger 62 are disposed in the third bypass flow path W43. The second hydrothermal-medium heat exchanger 62 is a portion that exchanges heat between the cooling water circulating in the cooling system 40 and the thermal medium circulating in the heat pump system 50. The pump 44 circulates the cooling water through the third bypass flow path W43 by sucking and pumping the cooling water flowing through the third bypass flow path W43. At two connection portions between the ring-shaped flow path W40 and the third bypass flow path W43, switching valves 454, 455, such as three-way valves for switching the connection states between the flow paths W40, W43, are respectively provided.

In the cooling system 40, the heating element 41 is basically cooled by the cooling water, which has been cooled by the cooling heat exchanger 22, circulating through the heating element 41. In the cooling system 40, the cooling water can be circulated between the cooling heat exchanger 22 and the hydrothermal-medium heat exchangers 61, 62, or the cooling water can be circulated between the heating element 41 and the hydrothermal-medium heat exchangers 61, 62, by switching the connection states between the flow paths with the switching valves 450 to 455.

The heat pump system 50 includes the first air-conditioning heat exchanger 24, a pressure regulating valve 51, a compressor 52, a first expansion valve 53, a second expansion valve 54, the first hydrothermal-medium heat exchanger 61, and the second hydrothermal-medium heat exchanger 62. The first air-conditioning heat exchanger 24, the pressure regulating valve 51, the compressor 52, the first hydrothermal-medium heat exchanger 61, and the first expansion valve 53 are connected in a ring by the ring-shaped flow path W50. The thermal medium circulates in the ring-shaped flow path W50.

The compressor 52 sucks and compresses the thermal medium flowing through the ring-shaped flow path W50 to discharge high-temperature and high-pressure gas-phase thermal medium, and circulates the thermal medium in the ring-shaped flow path W50. The high-temperature and high-pressure gas-phase thermal medium discharged from the compressor 52 flows into the first hydrothermal-medium heat exchanger 61 through the ring-shaped flow path W50.

In the first hydrothermal-medium heat exchanger 61, heat is exchanged between the high-temperature and high-pressure gas-phase thermal medium discharged from the compressor 52 and the cooling water circulating in the cooling system 40. As a result, the heat of the thermal medium is dissipated to the cooling water and the thermal medium condenses. The high-pressure liquid-phase thermal medium condensed in the first hydrothermal-medium heat exchanger 61 flows into the first expansion valve 53 through the ring-shaped flow path W50.

The first expansion valve 53 expands the high-pressure liquid-phase thermal medium discharged from the first hydrothermal-medium heat exchanger 61 to reduce the pressure of the liquid-phase thermal medium. The low-pressure liquid-phase thermal medium whose pressure has reduced by the first expansion valve 53 flows into the first air-conditioning heat exchanger 24 through the ring-shaped flow path W50.

In the first air-conditioning heat exchanger 24, heat is exchanged between the low-pressure liquid-phase thermal medium discharged from the first expansion valve 53 and the air-conditioning air, so that the thermal medium absorbs the heat of the air-conditioning air. As a result, the air-conditioning air is cooled. Low-temperature gas-phase thermal medium, which has evaporated by absorbing the heat of the air-conditioning air, flows through the pressure regulating valve 51 from the first air-conditioning heat exchanger 24. As a result, the pressure of the thermal medium is regulated, which is then sucked into the compressor 52.

When the thermal medium is circulating in the ring-shaped flow path W50, the heat pump system 50 operates as a so-called refrigeration cycle that cools the air-conditioning air, as described above.

On the other hand, the heat pump system 50 is provided with a bypass flow path W51 so as to connect, in the ring-shaped flow path W50, a downstream portion of the first hydrothermal-medium heat exchanger 61 and an upstream portion of the compressor 52. The bypass flow path W51 is provided with the second expansion valve 54 and the second hydrothermal-medium heat exchanger 62. At two connection portions between the ring-shaped flow path W50 and the bypass flow path W51, switching valves 550, 551, such as three-way valves for switching the connection states between the flow paths W50, W51, are provided. The switching valves 550, 551 constitute a flow path in which the thermal medium flows, for example, only through the ring-shaped flow path W50 without flowing through the bypass flow path W51. As a result, the heat pump system 50 can be driven as the refrigeration cycle, as described above.

The switching valves 550, 551 also constitute a flow path in which the thermal medium flows through the compressor 52, the first hydrothermal-medium heat exchanger 61, and the bypass flow path W51 without flowing through the first expansion valve 53 and the first air-conditioning heat exchanger 24.

When such a flow path is formed, the second expansion valve 54 expands the high-pressure liquid-phase thermal medium discharged from the first hydrothermal-medium heat exchanger 61 to reduce the pressure of the liquid-phase thermal medium. The low-pressure liquid-phase thermal medium whose pressure has been reduced by the second expansion valve 54 flows into the second hydrothermal-medium heat exchanger 62 through the bypass flow path W51.

In the second hydrothermal-medium heat exchanger 62, heat is exchanged between the low-pressure liquid-phase thermal medium discharged from the second expansion valve 54 and the cooling water flowing through the third bypass flow path W43 of the cooling system 40. As a result, the heat of the cooling water is absorbed by the thermal medium. Low-pressure gas-phase thermal medium, which has evaporated by absorbing the heat of the cooling water, is sucked into the compressor 52.

The compressor 52 sucks the low-pressure gas-phase thermal medium discharged from the second hydrothermal-medium heat exchanger 62 to compress the thermal medium. As a result, high-temperature and high-pressure gas-phase thermal medium is discharged. The high-temperature and high-pressure gas-phase thermal medium discharged from the compressor 52 flows into the first hydrothermal-medium heat exchanger 61.

In the first hydrothermal-medium heat exchanger 61, heat is exchanged between the high-temperature and high-pressure gas-phase thermal medium discharged from the compressor 52 and the cooling water flowing through the second bypass flow path W42 of the cooling system 40. As a result, the heat of the thermal medium is absorbed by the cooling water. By making the cooling water that has absorbed the heat of the thermal medium flow through the second air-conditioning heat exchanger 25 of the cooling system 40, the air-conditioning air can be heated in the second air-conditioning heat exchanger 25.

As described above, the heat pump system 50 can both cool and heat the air-conditioning air.

Figure 4:
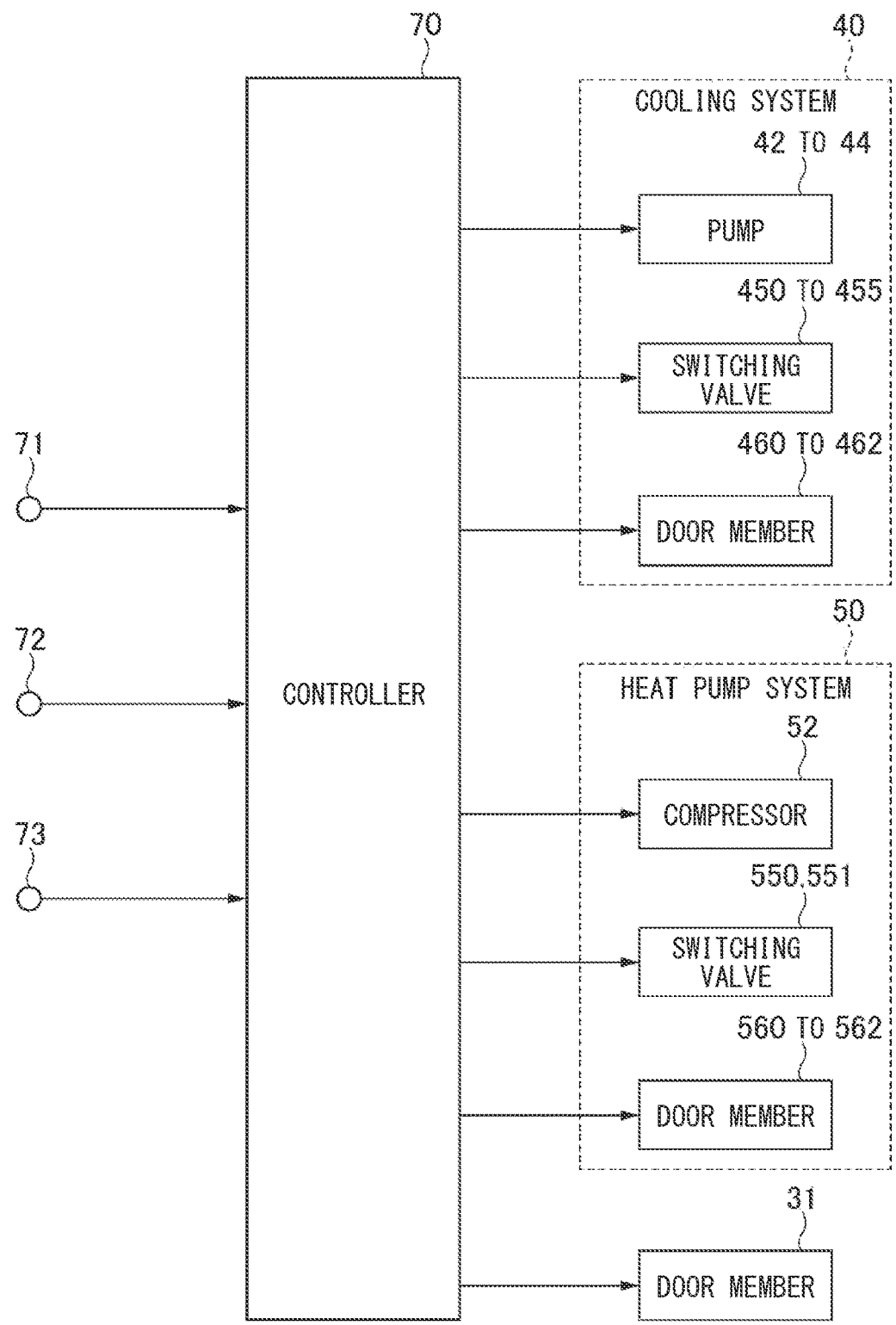
FIG. 4 is a block diagram illustrating an electrical configuration of the heat exchange system of the embodiment.

As illustrated in FIG. 4, the heat exchange system 30 includes a controller 70 that controls each of the systems 40, 50. The controller 70 is mainly composed of a microcomputer having a CPU, a memory, and the like. The controller 70 executes various processing for controlling each of the systems 40, 50 by executing programs stored in the memory in advance.

Specifically, the controller 70 incorporates output signals of temperature sensors 71, 72 and an operation unit 73. The temperature sensor 71 detects the temperature of the heating element 41, and outputs a signal, corresponding to the detected temperature of the heating element 41, to the controller 70. The temperature sensor 72 detects the temperature of the cooling heat exchanger 22, and outputs a signal, corresponding to the detected temperature of the cooling heat exchanger 22, to the controller 70. The operation unit 73 is a portion that is operated by an occupant of the vehicle 10. In the operation unit 73, it is possible to perform, for example, an operation for selecting whether to heat or cool the vehicle interior, an operation for selecting a set temperature of the vehicle interior, and the like. The operation unit 73 outputs a signal, corresponding to the operation of the occupant, to the controller 70.

As illustrated in FIG. 4, the cooling system 40 is provided with door members 460 to 462. The door members 460 to 462 open and close the cooling-side outside air inlet 210*a*, cooling-side vehicle interior-exterior communication port 214*a*, and the cooling-side vehicle interior-interior communication port 215*a* of the cooling passage 211 illustrated in FIG. 2, respectively. The heat pump system 50 is provided with door members 560 to 562. The door members 560 to 562 open and close the air-conditioning-side outside air inlet 210*b*, air-conditioning-side vehicle interior-exterior communication port 214*b*, and air-conditioning-side vehicle interior-interior communication port 215*b* of the air conditioning passage 212 illustrated in FIG. 2, respectively. Furthermore, the heat exchange system 30 is provided with a door member 31 for opening and closing the communication passage 216 illustrated in FIG. 2. Note that the door members 460 to 462, 560 to 562, 31 are components of the heat exchange module 20.

The controller 70 controls each component of the cooling system 40, each component of the heat pump system 50, and the door member 31 according to the temperature of the heating element 41, the temperature of the cooling heat exchanger 22, the operation on the operation unit 73 by the occupant, and the like by the output signal of each of the temperature sensors 71, 72 and the operation unit 73. As a result, the controller 70 drives each of the systems 40, 50 in any of a heating element cooling mode, a heating element cooling-cooling mode, a heating mode, and a frost protection mode.

Next, the details of each mode will be described with reference to FIGS. 5 to 12. In FIGS. 5, 7, 9, and 11, a flow path through which the cooling water or the thermal medium is flowing is illustrated by a solid line, and a flow path through which neither the cooling water nor the thermal medium is flowing is illustrated by a broken line. In FIGS. 6, 8, 10, and 12, portions, which are in a closed state, of the outside air inlet 210, the vehicle interior-exterior communication port 214, the vehicle interior-interior communication port 215, and the communication passage 216 are illustrated by dot hatching. Furthermore, in FIGS. 6, 8, 10, and 12, the air flow direction is illustrated by an arrow.

<Heating Element Cooling Mode>

The heating element cooling mode is a mode for cooling the heating element 41. The controller 70 operates each of the systems 40, 50 in the heating element cooling mode, for example, based on the fact that the temperature of the heating element 41 becomes equal to or higher than a predetermined temperature. In the heating element cooling mode, a cooling water flow path and a thermal medium flow path, as illustrated in FIG. 5, are formed in each of the systems 40, 50.

Figure 5:
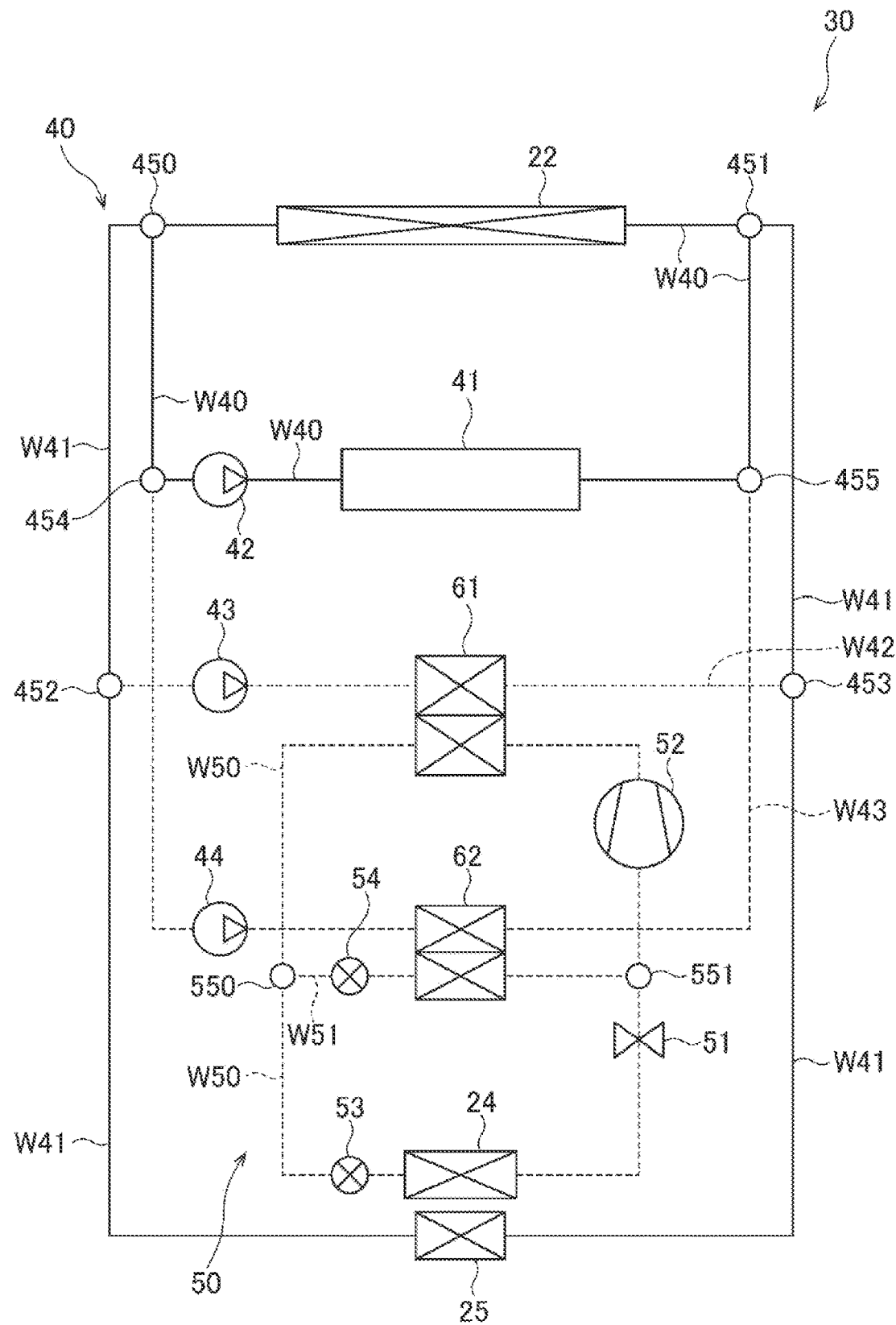
FIG. 5 is a block diagram illustrating an operation example of the heat exchange system in a heating element cooling mode of the embodiment.

As illustrated in FIG. 5, the controller 70 switches the open-closed states of the switching valves 450 to 455 such that: the cooling water flows through the heating element 41, the cooling heat exchanger 22, and the second air-conditioning heat exchanger 25; and the cooling water does not flow through the first hydrothermal-medium heat exchanger 61 and the second hydrothermal-medium heat exchanger 62. In addition, the controller 70 drives the pump 42 and stops the pumps 43, 44. Furthermore, the controller 70 does not circulate the thermal medium in the heat pump system 50 by stopping the compressor 52 of the heat pump system 50.

Figure 6:
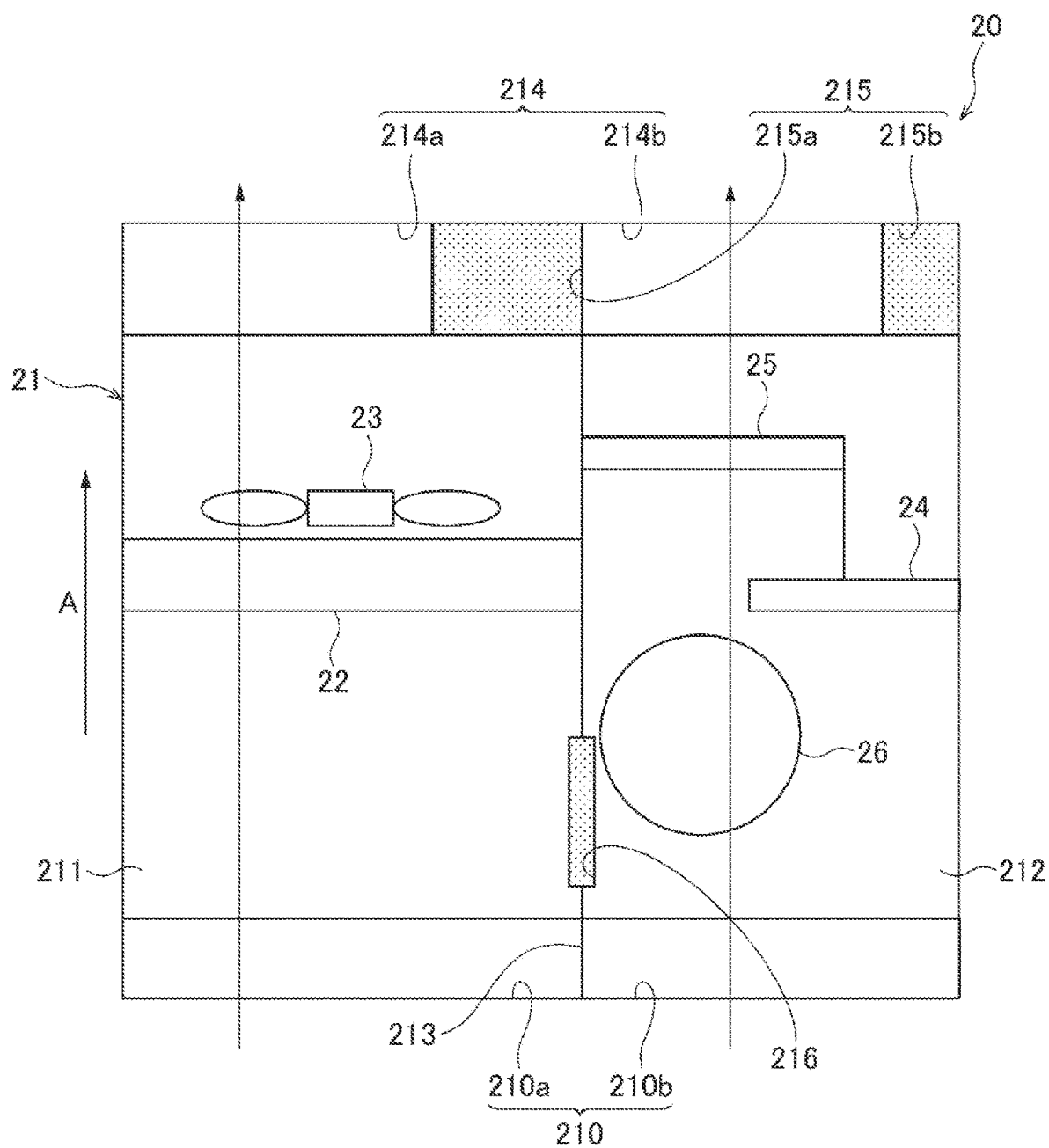
FIG. 6 is a block diagram illustrating an operation example of the heat exchange module in the heating element cooling mode of the embodiment.

As illustrated in FIG. 6, the controller 70 also controls each of the door members 460 to 462, 560 to 562, 31 such that: the cooling-side outside air inlet 210*a*, the air-conditioning-side outside air inlet 210*b*, the cooling-side vehicle interior-exterior communication port 214*a*, and the air-conditioning-side vehicle interior-exterior communication port 214*b* are opened; and the cooling-side vehicle interior-interior communication port 215*a*, the air-conditioning-side vehicle interior-interior communication port 215*b*, and the communication passage 216 are closed. The controller 70 further drives the blowers 23, 26. As a result, in the cooling passage 211, the outside air introduced from the cooling-side outside air inlet 210*a* passes through the cooling heat exchanger 22, and then is discharged outside the vehicle interior from the cooling-side vehicle interior-exterior communication port 214*a*. In the air conditioning passage 212, the outside air introduced from the air-conditioning-side outside air inlet 210*b* passes through the second air-conditioning heat exchanger 25, and then is discharged outside the vehicle interior from the air-conditioning-side vehicle interior-exterior communication port 214*b*.

When the air flow as illustrated in FIG. 6 is formed, heat is exchanged, in the cooling heat exchanger 22, between the cooling water flowing through the inside thereof and the outside air flowing through the cooling passage 211. As a result, the cooling water is cooled. In the second air-conditioning heat exchanger 25, heat is exchanged between the cooling water flowing through the inside thereof and the outside air flowing through the air conditioning passage 212. As a result, the cooling water is cooled. In the heating element cooling mode, this is used to dissipate the heat of the cooling water, which has absorbed the heat of the heating element 41, in both the cooling heat exchanger 22 and the second air-conditioning heat exchanger 25 by making the cooling water flow not only through the cooling heat exchanger 22 but also through the second air-conditioning heat exchanger 25, as illustrated in FIG. 5. That is, in the heating element cooling mode, when the cooling heat exchanger 22 is assumed to be a first radiator, the second air-conditioning heat exchanger 25 functions as a second radiator. In the cooling system 40, the cooling water, which has been cooled by the cooling heat exchanger 22 and the second air-conditioning heat exchanger 25, circulates through the heating element 41. As a result, the heating element 41 is cooled.

As described above, the heating element cooling mode is a mode for cooling only the heating element 41.

<Heating Element Cooling-Cooling Mode>

The heating element cooling-cooling mode is a mode for cooling the heating element 41 and cooling the vehicle interior. For example, when the temperature of the heating element 41 is equal to or higher than a predetermined temperature, and when cooling of the vehicle interior is selected by the operation unit 73, the controller 70 operates each of the systems 40, 50 in the heating element cooling-cooling mode. Alternatively, when cooling of the vehicle interior is automatically performed based on the deviation between the temperature of the vehicle interior and a target temperature of the vehicle interior set by the operation unit 73, or the like, the controller 70 may operate each of the systems 40, 50 in the heating element cooling-cooling mode. In the heating element cooling-cooling mode, a cooling water flow path and a thermal medium flow path, as illustrated in FIG. 7, are formed in each of the systems 40, 50.

Figure 7:
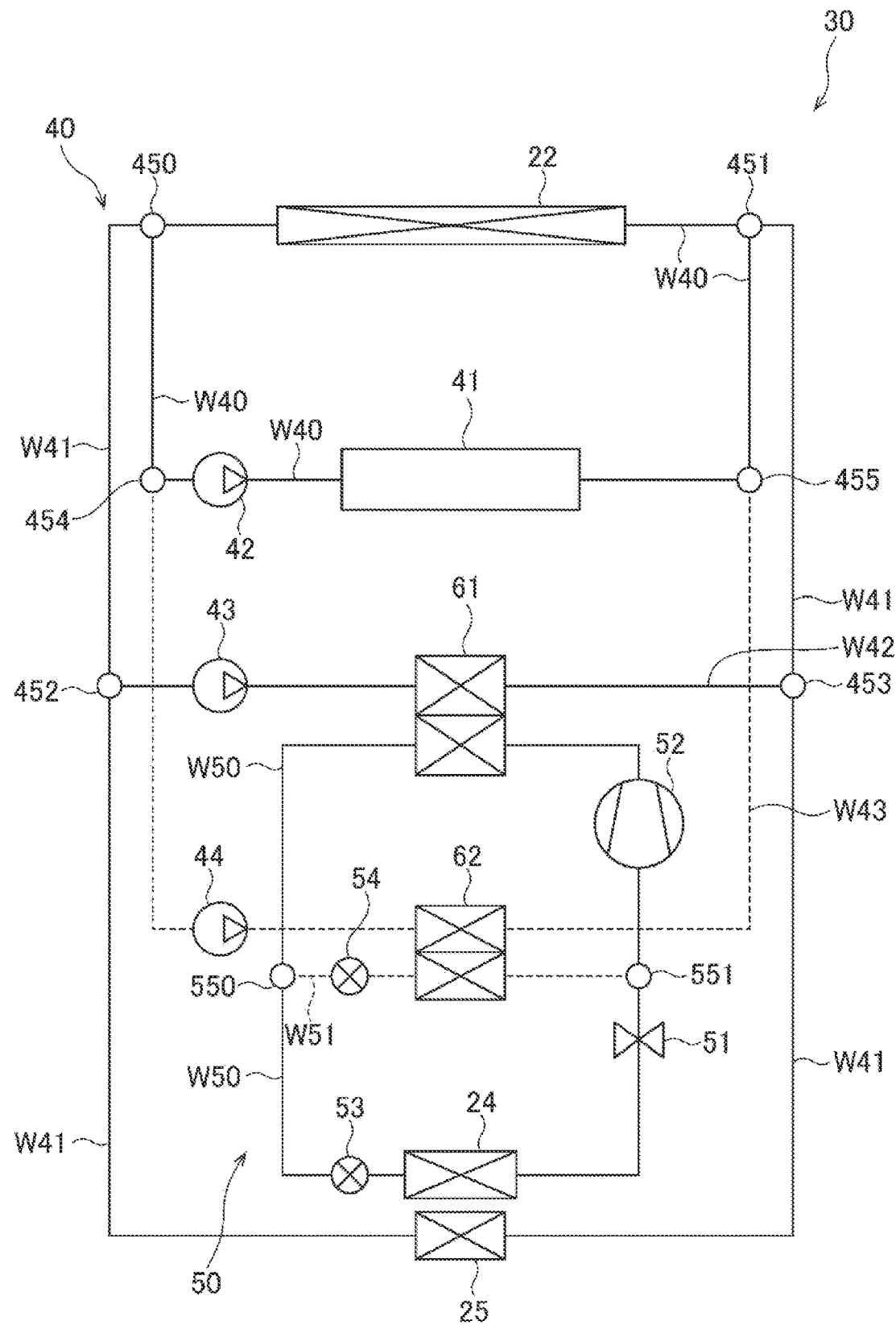
FIG. 7 is a block diagram illustrating an operation example of the heat exchange system in a heating element cooling-cooling mode of the embodiment.

As illustrated in FIG. 7, the controller 70 switches the open-closed states of the switching valves 450 to 455 such that: the cooling water flows through the heating element 41, the cooling heat exchanger 22, the first hydrothermal-medium heat exchanger 61, and the second air-conditioning heat exchanger 25; and the cooling water does not flow through the second hydrothermal-medium heat exchanger 62. The controller 70 also drives the pumps 42, 43 of the cooling system 40. Furthermore, the controller 70 switches the open-closed states of the switching valves 550, 551 such that: the thermal medium flows through the compressor 52, the first hydrothermal-medium heat exchanger 61, the first expansion valve 53, the first air-conditioning heat exchanger 24, and the pressure regulating valve 51; and the thermal medium does not flow through the second hydrothermal-medium heat exchanger 62. The controller 70 also drives the compressor 52.

Figure 8:
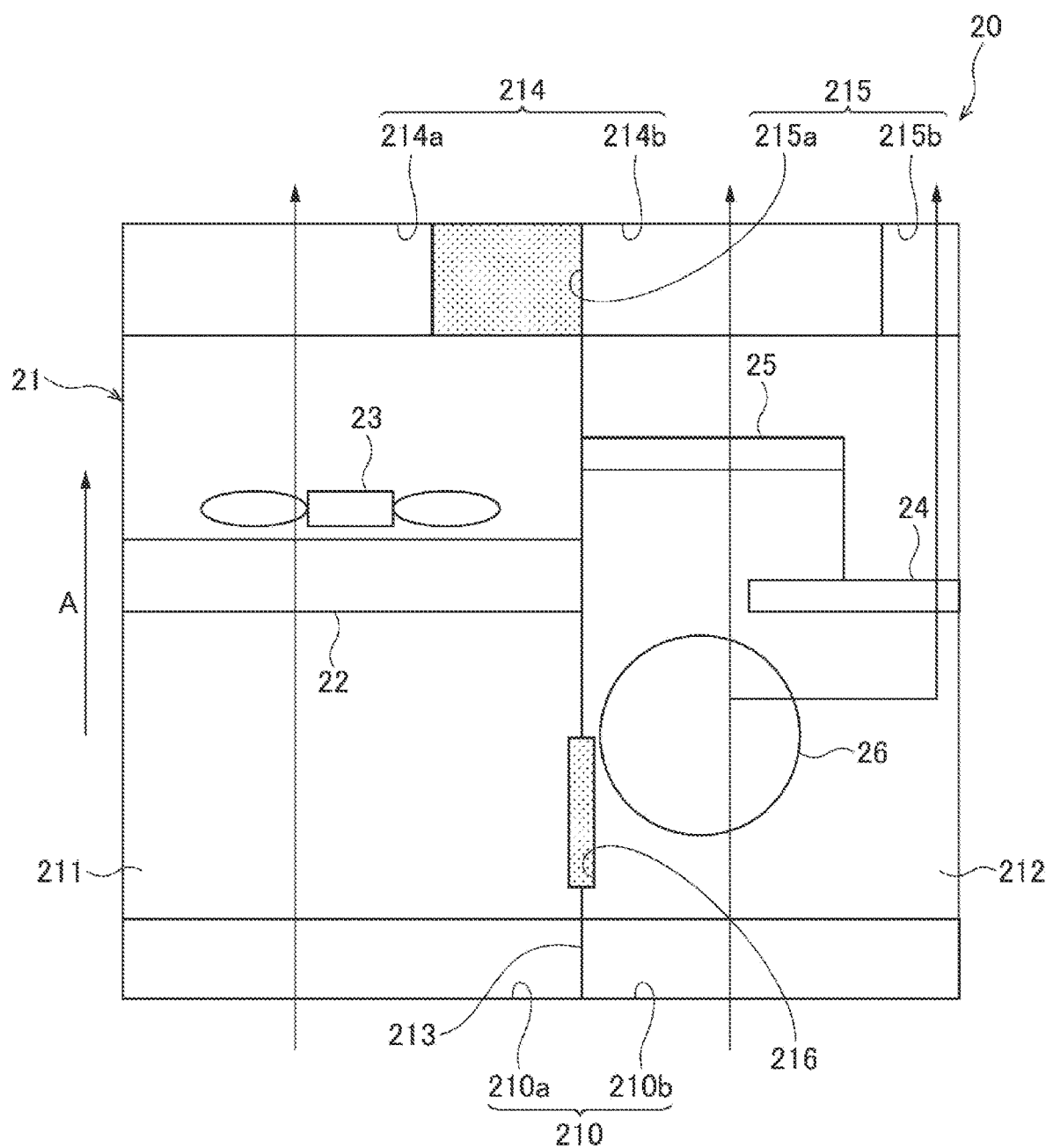
FIG. 8 is a block diagram illustrating an operation example of the heat exchange module in the heating element cooling-cooling mode of the embodiment.

In addition, the controller 70 controls each of the door members 460 to 462, 560 to 562, 31 such that: the cooling-side outside air inlet 210a, the air-conditioning-side outside air inlet 210b, the cooling-side vehicle interior-exterior communication port 214a, the air-conditioning-side vehicle interior-exterior communication port 214b, and the air-conditioning-side vehicle interior-interior communication port 215b are opened; and the cooling-side vehicle interior-interior communication port 215a and the communication passage 216 are closed, as illustrated in FIG. 8. The controller 70 also drives the blowers 23, 26. As a result, in the cooling passage 211, the outside air introduced from the cooling-side outside air inlet 210a passes through the cooling heat exchanger 22, and then is discharged outside the vehicle interior from the cooling-side vehicle interior-exterior communication port 214a. In the air conditioning passage 212, the outside air introduced from the air-conditioning-side outside air inlet 210b passes through the first air-conditioning heat exchanger 24 and the second air-conditioning heat exchanger 25, and then is discharged inside and outside the vehicle interior from the air-conditioning-side vehicle interior-exterior communication port 214b and the air-conditioning-side vehicle interior-interior communication port 215b, respectively.

When the air flow as illustrated in FIG. 8 is formed, heat is exchanged, in the cooling heat exchanger 22, between the cooling water flowing through the inside thereof and the outside air flowing through the cooling passage 211. As a result, the cooling water is cooled. In the second air-conditioning heat exchanger 25, heat is exchanged between the cooling water flowing through the inside thereof and the outside air flowing through the air conditioning passage 212. As a result, the cooling water is cooled. In the heating element cooling-cooling mode, the cooling water, which has absorbed the heat of the heating element 41, flows through the cooling heat exchanger 22 and the second air-conditioning heat exchanger 25, as illustrated in FIG. 7. As a result, the heat of the cooling water is dissipated in both the cooling heat exchanger 22 and the second air-conditioning heat exchanger 25. Therefore, in the heating element cooling-cooling mode, when the cooling heat exchanger 22 is assumed to be a first radiator, the second air-conditioning heat exchanger 25 functions as a second radiator, similarly to the heating element cooling mode. In the cooling system 40, the cooling water, which has been cooled by the cooling heat exchanger 22 and the second air-conditioning heat exchanger 25, circulates through the heating element 41. As a result, the heating element 41 can be cooled.

On the other hand, the cooling water, which has been cooled in the cooling heat exchanger 22 and the second air-conditioning heat exchanger 25, flows through the first hydrothermal-medium heat exchanger 61, as illustrated in FIG. 7. In the first hydrothermal-medium heat exchanger 61, heat is exchanged between the high-temperature and high-pressure gas-phase thermal medium compressed by the compressor 52 and the cooling water, so that the heat of the thermal medium is absorbed by the cooling water. As a result, the thermal medium condenses. In the heat pump system 50, the first hydrothermal-medium heat exchanger 61 substantially functions as a refrigerant condenser, as described above. The high-pressure liquid-phase thermal medium condensed in the first hydrothermal-medium heat exchanger 61 becomes a low-pressure liquid-phase thermal medium when the pressure thereof is reduced through the first expansion valve 53. Thereafter, the low-pressure liquid-phase thermal medium flows into the first air-conditioning heat exchanger 24. In the first air-conditioning heat exchanger 24, heat is exchanged between the low-pressure liquid-phase thermal medium flowing through the inside thereof and the outside air flowing through the air conditioning passage 212, as illustrated in FIG. 8. As a result, the outside air is cooled. In the heat pump system 50, the first air-conditioning heat exchanger 24 functions as an evaporator, as described above. The outside air cooled in the first air-conditioning heat exchanger 24 is introduced, as the air-conditioning air, into the vehicle interior through the air-conditioning-side vehicle interior-interior communication port 215b. As a result, the vehicle interior is cooled. Therefore, the heat pump system 50 operates as the refrigeration cycle.

As described above, the heating element cooling-cooling mode is a mode for both cooling the heating element 41 and cooling the vehicle interior.

<Heating Mode>

The heating mode is a mode for heating the vehicle interior. For example, when heating of the vehicle interior is selected by the operation unit 73, the controller 70 operates each of the systems 40, 50 in the heating mode. Note that when heating of the vehicle interior is automatically executed based on the deviation between the temperature of the vehicle interior and a target temperature of the vehicle interior set by the operation unit 73, or the like, the controller 70 may operate each of the systems 40, 50 in the heating element cooling-cooling mode. In the heating mode, a cooling water flow path and a thermal medium flow path, as illustrated in FIG. 9, are formed in each of the systems 40, 50.

Figure 9:
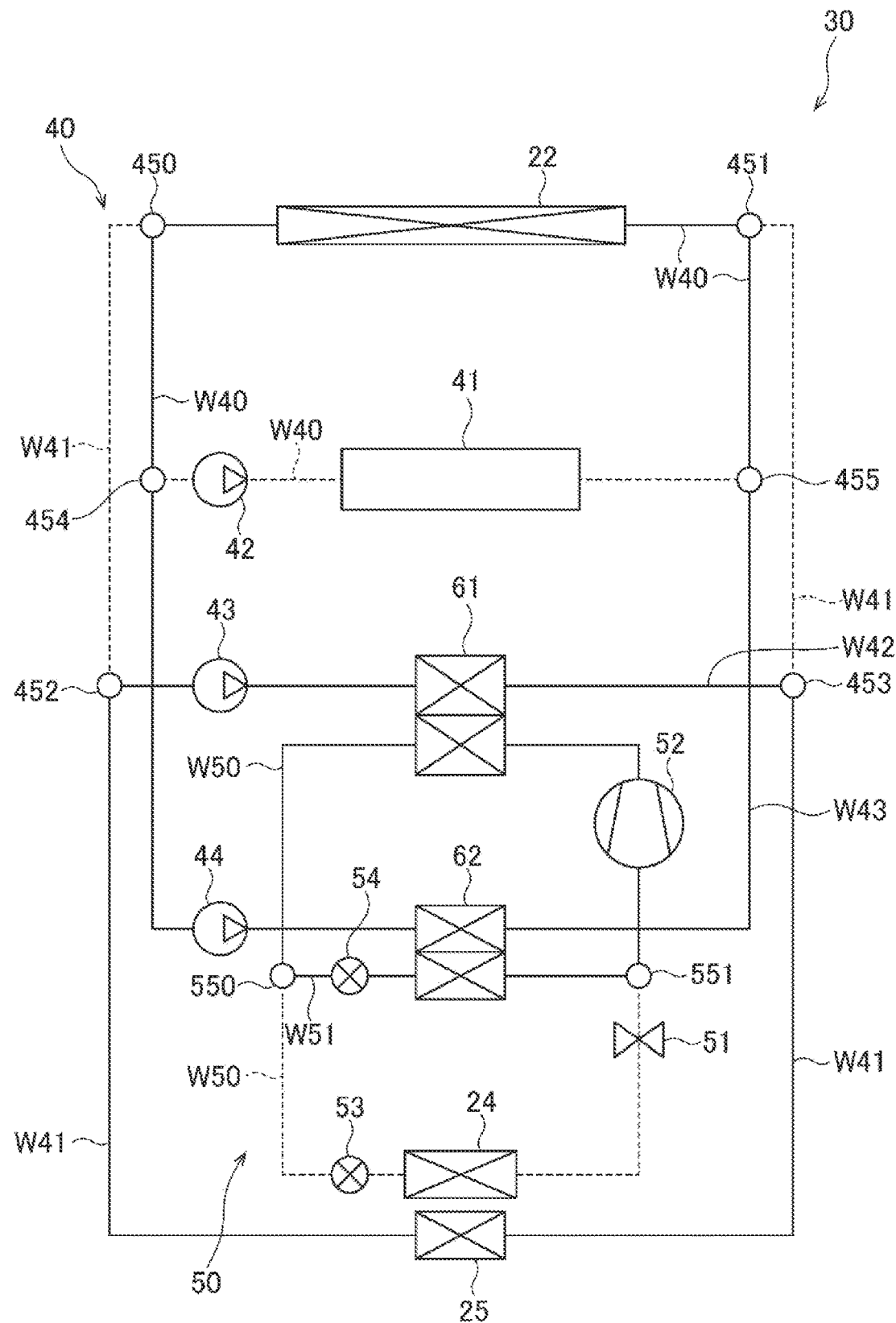
FIG. 9 is a block diagram illustrating an operation example of the heat exchange system in a heating mode of the embodiment.

As illustrated in FIG. 9, the controller 70 switches the open-closed states of the switching valves 450 to 455 such that: the cooling water circulates between the cooling heat exchanger 22 and the second hydrothermal-medium heat exchanger 62; and the cooling water circulates between the first hydrothermal-medium heat exchanger 61 and the second air-conditioning heat exchanger 25. The controller 70 also drives the pumps 42, 43 of the cooling system 40. Furthermore, the controller 70 switches the open-closed states of the switching valves 550, 551 such that: the thermal medium flows through the compressor 52, the first hydrothermal-medium heat exchanger 61, the second expansion valve 54, and the second hydrothermal-medium heat exchanger 62; and the thermal medium does not flow through the first air-conditioning heat exchanger 24. The controller 70 also drives the compressor 52.

Figure 10:
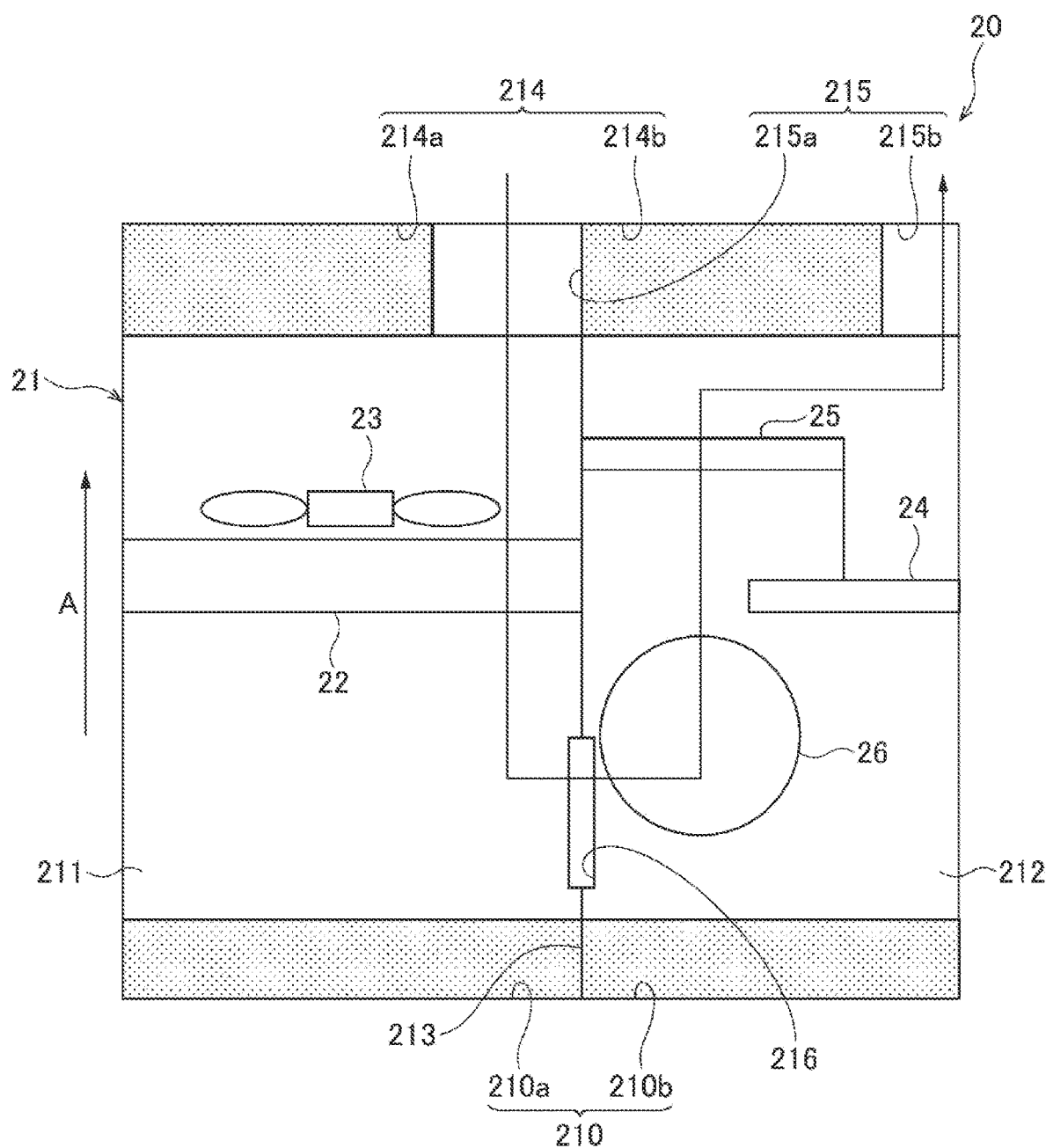
FIG. 10 is a block diagram illustrating an operation example of the heat exchange module in the heating mode of the embodiment.

As illustrated in FIG. 10, the controller 70 also controls each of the door members 460 to 462, 560 to 562, 31 such that: the cooling-side vehicle interior-interior communication port 215a, the air-conditioning-side vehicle interior-interior communication port 215b, and the communication passage 216 are opened; and the cooling-side outside air inlet 210a, the air-conditioning-side outside air inlet 210b, the cooling-side vehicle interior-exterior communication port 214a, and the air-conditioning-side vehicle interior-exterior communication port 214b are closed. Furthermore, the controller 70 stops the first blower 23 and drives the second blower 26. As a result, it is designed such that the air in the vehicle interior introduced from the cooling-side vehicle interior-interior communication port 215a sequentially passes through the cooling passage 211, the communication passage 216, and the air conditioning passage 212, and then flows into the vehicle interior from the air-conditioning-side vehicle interior-interior communication port 215b. Note that when the first blower 23 is reversible, the controller 70 may drive the first blower 23. Hereinafter, the air in the vehicle interior is called "inside air".

When the air flow as illustrated in FIG. 10 is formed, heat is exchanged, in the cooling heat exchanger 22, between the cooling water flowing through the inside thereof and the inside air flowing through the cooling passage 211. As a result, the heat of the inside air is absorbed by the cooling water. The cooling water, which has absorbed the heat of the inside air, flows through the second hydrothermal-medium heat exchanger 62, as illustrated in FIG. 9. A low-pressure liquid-phase thermal medium whose pressure has been reduced by the second expansion valve 54 flows through the second hydrothermal-medium heat exchanger 62. In the second hydrothermal-medium heat exchanger 62, heat is exchanged between the cooling water that has absorbed the heat of the inside air and the low-pressure liquid-phase thermal medium, so that the liquid-phase thermal medium absorbs the heat of the cooling water. As a result, the liquid-phase thermal medium evaporates. Therefore, in the heat pump system 50, the second hydrothermal-medium heat exchanger 62 substantially functions as an evaporator.

As illustrated in FIG. 9, the low-pressure gas-phase thermal medium, which has evaporated in the second hydrothermal-medium heat exchanger 62, is compressed by the compressor 52 to become a high-temperature and high-pressure gas-phase thermal medium. Thereafter, the gas-phase thermal medium flows into the first hydrothermal-medium heat exchanger 61. In the first hydrothermal-medium heat exchanger 61, heat is exchanged between the high-temperature and high-pressure gas-phase thermal medium compressed by the compressor 52 and the cooling water. As a result, the heat of the thermal medium is absorbed by the cooling water. Therefore, in the heat pump system 50, the first hydrothermal-medium heat exchanger 61 substantially functions as a refrigerant condenser. The cooling water heated by absorbing the heat of the thermal medium flows through the second air-conditioning heat exchanger 25. In the second air-conditioning heat exchanger 25, heat is exchanged between the inside air flowing through the air conditioning passage 212 and the cooling water, as illustrated in FIG. 10. As a result, the inside air is heated. Therefore, the second air-conditioning heat exchanger 25 functions as a heater core that heats the air-conditioning air. Since the inside air heated in the second air-conditioning heat exchanger 25 flows into the vehicle interior through the air-conditioning-side vehicle interior-interior communication port 215b, the vehicle interior can be heated.

As described above, the heating mode is a mode for heating the vehicle interior.

<Frost Protection Mode>

The frost protection mode is a mode for preventing in advance frost from being formed on the cooling heat exchanger 22 while the heat exchange module is operating in the heating mode. The controller 70 monitors, for example, the temperature of the cooling heat exchanger 22 by the temperature sensor 72 while the heat exchange module is operating in the heating mode. Based on the fact that the temperature of the cooling heat exchanger 22 becomes equal to or lower than a first predetermined temperature, the controller 70 shifts the mode from the heating mode to the frost protection mode. The first predetermined temperature is set to a temperature slightly higher than the temperature at which frost is actually formed on the cooling heat exchanger 22. In the present embodiment, the temperature sensor 72 corresponds to a frosted-state detection unit for detecting a frosted state of the cooling heat exchanger 22. Based on the fact that the temperature of the cooling heat exchanger 22 becomes higher than a second predetermined temperature after the frost protection mode is executed, or based on the fact that the frost protection mode has been executed for a predetermined time, the controller 70 shifts the mode from the frost protection mode to the heating mode. The second predetermined temperature is a temperature higher than the first predetermined temperature. As described above, the frost protection mode is executed when the possibility of frost being formed on the cooling heat exchanger 22 becomes high while the heating mode is being executed. In the frost protection mode, a cooling water flow path and a thermal medium flow path, as illustrated in FIG. 11, are formed in each of the systems 40, 50.

Figure 11:
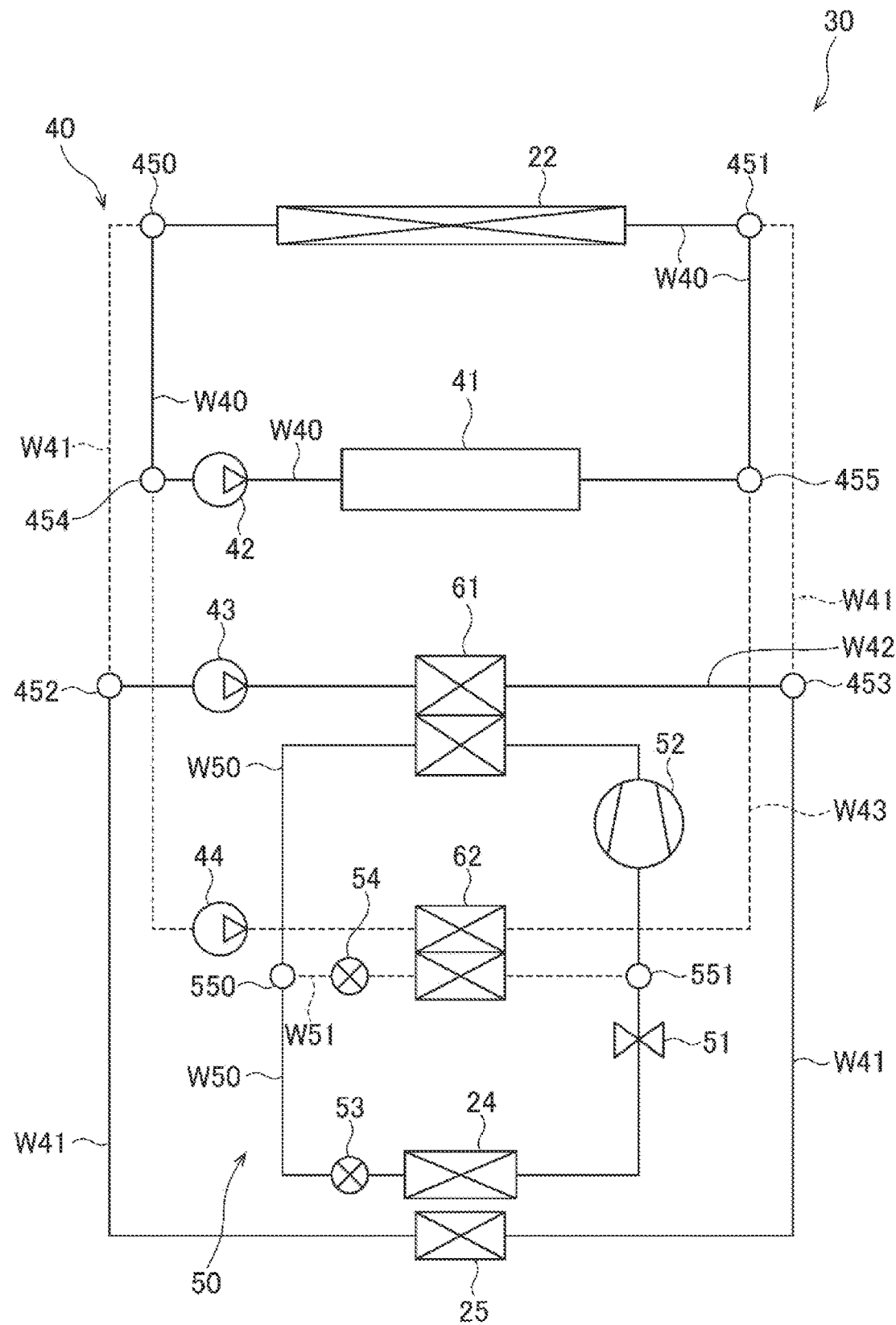
FIG. 11 is a block diagram illustrating an operation example of the heat exchange system in a frost protection mode of the embodiment.

As illustrated in FIG. 11, the controller 70 switches the open-closed states of the switching valves 450 to 455 such that: the cooling water circulates between the heating element 41 and the cooling heat exchanger 22; and the cooling water circulates between the first hydrothermal-medium heat exchanger 61 and the second air-conditioning heat exchanger 25. The controller 70 also drives the pumps 42, 43 of the cooling system 40. Furthermore, the controller 70 switches the open-closed states of the switching valves 550, 551 such that: the thermal medium flows through the compressor 52, the first hydrothermal-medium heat exchanger 61, the first expansion valve 53, the first air-conditioning heat exchanger 24, and the pressure regulating valve 51; and the thermal medium does not flow through the second hydrothermal-medium heat exchanger 62. The controller 70 also drives the compressor 52.

Figure 12:
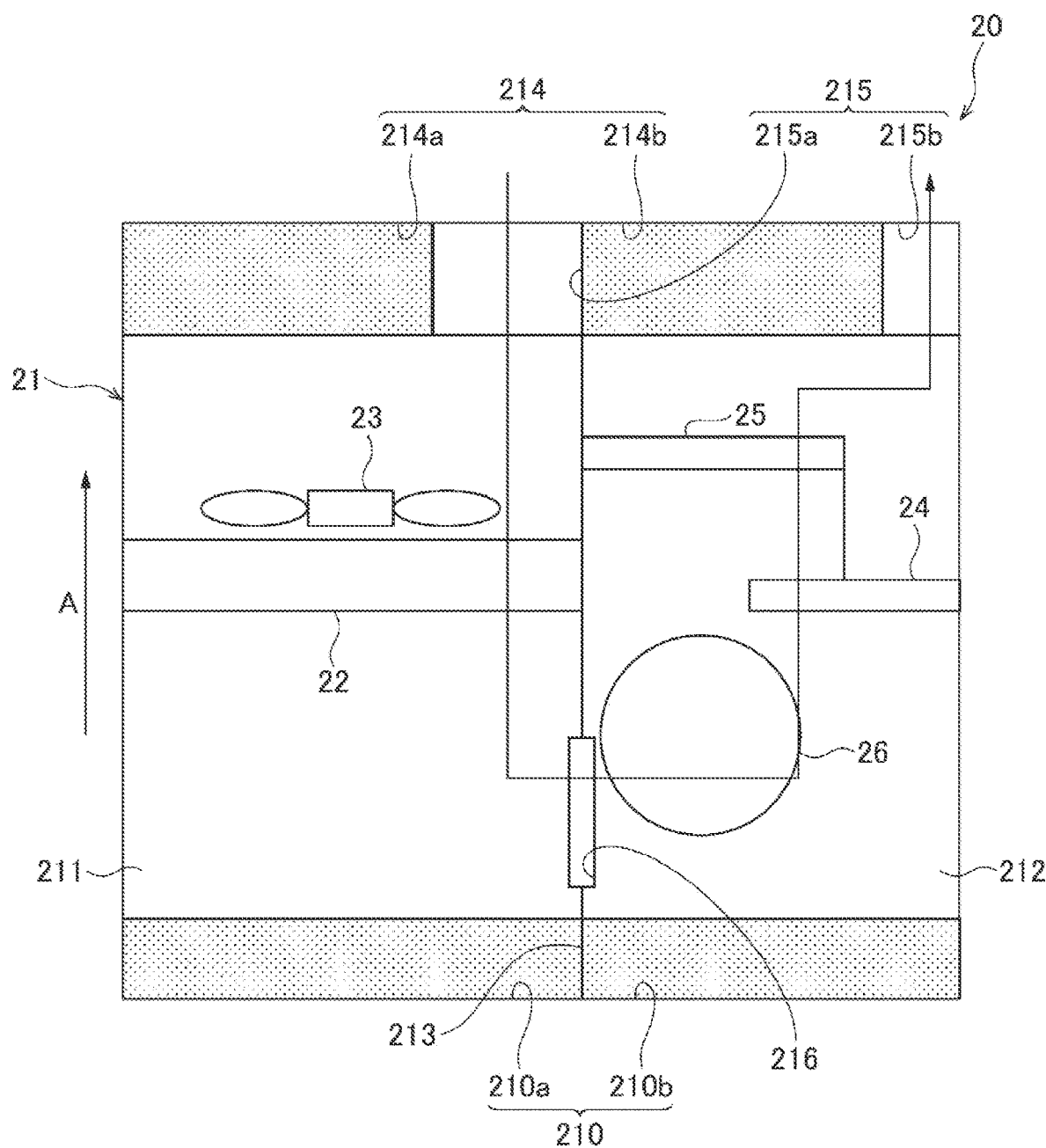
FIG. 12 is a block diagram illustrating an operation example of the heat exchange module in the frost protection mode of the embodiment.

As illustrated in FIG. 12, the controller 70 also controls each of the door members 460 to 462, 560 to 562, 31 such that: the cooling-side vehicle interior-interior communication port 215a, the air-conditioning-side vehicle interior-interior communication port 215b, and the communication passage 216 are opened; and the cooling-side outside air inlet 210a, the air-conditioning-side outside air inlet 210b, the cooling-side vehicle interior-exterior communication port 214a, and the air-conditioning-side vehicle interior-exterior communication port 214b are closed. Furthermore, the controller 70 stops the first blower 23 and drives the second blower 26. As a result, it is designed such that the air in the vehicle interior introduced from the cooling-side vehicle interior-interior communication port 215a sequentially passes through the cooling passage 211, the communication passage 216, and the air conditioning passage 212, and then flows into the vehicle interior from the air-conditioning-side vehicle interior-interior communication port 215b. Note that when the first blower 23 is reversible, the controller 70 may drive the first blower 23.

As illustrated in FIG. 11, the cooling water circulates between the heating element 41 and the cooling heat exchanger 22, so that the cooling water that has absorbed the heat of the heating element 41 flows through the cooling heat exchanger 22. As a result, the temperature of the cooling heat exchanger 22 can be raised. Therefore, frost is prevented in advance from being formed on the cooling heat exchanger 22.

On the other hand, a low-pressure liquid-phase thermal medium whose pressure has been reduced by the first expansion valve 53 is flowing through the first air-conditioning heat exchanger 24. In the first air-conditioning heat exchanger 24, heat is exchanged between the low-pressure liquid-phase thermal medium flowing through the inside thereof and the inside air flowing through the air conditioning passage 212, as illustrated in FIG. 12, so that the thermal medium absorbs the heat of the inside air. As a result, the thermal medium evaporates. Therefore, in the frost protection mode, the first air-conditioning heat exchanger 24 substantially functions as an evaporator.

The low-pressure gas-phase thermal medium, which has evaporated in the first air-conditioning heat exchanger 24, flows to the compressor 52 through the pressure regulating valve 51, as illustrated in FIG. 11, and is compressed by the compressor 52 to become a high-temperature and high-pressure gas-phase thermal medium. Thereafter, the gas-phase thermal medium flows into the first hydrothermal-medium heat exchanger 61. In the first hydrothermal-medium heat exchanger 61, heat is exchanged between the high-temperature and high-pressure gas-phase thermal medium compressed by the compressor 52 and the cooling water. As a result, the heat of the thermal medium is absorbed by the cooling water. Therefore, in the heat pump system 50, the first hydrothermal-medium heat exchanger 61 substantially functions as a refrigerant condenser. The cooling water heated by absorbing the heat of the thermal medium flows through the second air-conditioning heat exchanger 25. In the second air-conditioning heat exchanger 25, heat is exchanged between the inside air flowing through the air conditioning passage 212 and the cooling water, as illustrated in FIG. 12. As a result, the inside air is heated. Therefore, the second air-conditioning heat exchanger 25 functions as a heater core that heats the air-conditioning air. Since the inside air heated in the second air-conditioning heat exchanger 25 flows into the vehicle interior through the air-conditioning-side vehicle interior-interior communication port 215b, the vehicle interior can be heated.

As described above, the frost protection mode is a mode for preventing in advance frost from being formed on the cooling heat exchanger 22 while the vehicle interior is being heated.

According to the heat exchange system 30 of the vehicle 10 of the present embodiment described above, the actions and effects described in the following (1) to (6) can be obtained.

(1) On the downstream side of the second air-conditioning heat exchanger 25 in the air conditioning passage 212, the air-conditioning-side vehicle interior-exterior communication port 214b, which guides the air that has passed through the second air-conditioning heat exchanger 25 to the outside of the vehicle interior, is provided. When the first air-conditioning heat exchanger 24 operates as an evaporator in the heating element cooling mode and the heating element cooling-cooling mode, cooling water for cooling the heating element 41 flows through the second air-conditioning heat exchanger 25, and the air that has passed through the second air-conditioning heat exchanger 25 is discharged outside the vehicle interior through the air-conditioning-side vehicle interior-exterior communication port 214b. According to this configuration, while the first air-conditioning heat exchanger 24 is operating as an evaporator, the cooling water for cooling the heating element 41 flows not only through the cooling heat exchanger 22 but also through the second air-conditioning heat exchanger 25. As a result, the heat of the cooling water can be dissipated in both the cooling heat exchanger 22 and the second air-conditioning heat exchanger 25. That is, both the cooling heat exchanger 22 and the second air-conditioning heat exchanger 25 function as a radiator. As a result, the amount of heat dissipation required of the cooling heat exchanger 22 can be reduced as compared with the case where the heat of the cooling water is dissipated only by the cooling heat exchanger 22, so that the cooling heat exchanger 22 can be simplified, such as downsizing the cooling heat exchanger 22 or reducing the number of heat exchange parts in the cooling heat exchanger 22. In addition, the air-conditioning air can be heated and cooled in the first air-conditioning heat exchanger 24 and the second air-conditioning heat exchanger 25, so that the vehicle interior can be air conditioned. Furthermore, the heating element 41 can be cooled by the cooling water flowing through the cooling heat exchanger 22. Note that the air that has exchanged heat with the cooling water in the second air-conditioning heat exchanger 25 is discharged outside the vehicle interior through the air-conditioning-side vehicle interior-exterior communication port 214b, so that the air can be suppressed from affecting the air conditioning of the vehicle interior.

(2) In the heating mode, the second hydrothermal-medium heat exchanger 62 operates as an evaporator. The cooling water, which has absorbed the heat of the thermal medium in the first hydrothermal-medium heat exchanger 61, flows through the second air-conditioning heat exchanger 25. As a result, the cooling water, which has absorbed the heat of the thermal medium in the second hydrothermal-medium heat exchanger 62, flows through the second air-conditioning heat exchanger 25, so that the second air-conditioning heat exchanger 25 operates as a heater core. As a result, the air-conditioning air can be heated. As a result, the vehicle interior can be heated.

(3) In the frost protection mode, the first air-conditioning heat exchanger 24 operates as an evaporator, and the second hydrothermal-medium heat exchanger 62 does not operate as an evaporator. In addition, the first hydrothermal-medium heat exchanger 61 operates as a refrigerant condenser, so that the cooling water, which has absorbed the heat of the thermal medium in the first hydrothermal-medium heat exchanger 61, flows through the second air-conditioning heat exchanger 25. The cooling water also circulates between the heating element 41 and the cooling heat exchanger 22. According to this configuration, the cooling water, which has absorbed the heat of the thermal medium, flows through the second air-conditioning heat exchanger 25, so that the second air-conditioning heat exchanger 25 operates as a heater core. As a result, the air-conditioning air can be heated. Therefore, the vehicle interior can be heated. In addition, the cooling water, which has absorbed the heat of the heating element 41, flows through the cooling heat exchanger 22, so that the cooling heat exchanger 22 can be defrosted, or frost can be suppressed from being formed thereon. Therefore, the heating mode can be continuously operated by switching between the heating mode and the frost protection mode depending on the frosted state of the cooling heat exchanger 22.

(4) In the frost protection mode, the first blower 23 rotates in a direction opposite to a rotation direction occurring when an air flow, moving from the cooling-side outside air inlet 210*a* toward the cooling-side vehicle interior-exterior communication port 214*a*, is formed. As a result, the inside air is introduced into the cooling passage 211 from the cooling-side vehicle interior-interior communication port 215*a*. According to this configuration, the heat of the inside air introduced into the cooling passage 211 can be absorbed by the cooling heat exchanger 22. As a result, the cooling heat exchanger 22 can effectively defrosted, or frost can be effectively suppressed from being formed thereon.

(5) The heat exchange system 30 further includes the door member 460 as a first opening-closing unit that opens and closes the cooling-side outside air inlet 210*a*, and the door member 461 as a second opening-closing unit that opens and closes the cooling-side vehicle interior-exterior communication port 214*a*. According to this configuration, the cooling-side outside air inlet 210*a* and the cooling-side vehicle interior-exterior communication port 214*a* are closed by the door members 460, 461 in the frost protection mode. As a result, the outside air introduced therefrom hardly hits the cooling heat exchanger 22. Therefore, it is possible for only the inside air to hit the cooling heat exchanger 22 in the frost protection mode, so that the cooling heat exchanger 22 can be effectively defrosted, or frost can be effectively suppressed from being formed thereon.

(6) In the frost protection mode, the inside air introduced into the cooling passage 211 from the cooling-side vehicle interior-interior communication port 215*a* passes through the cooling heat exchanger 22, and then flows through the second air-conditioning heat exchanger 25. According to this configuration, heating of the vehicle interior, corresponding to an inside air circulation mode, can be performed by heating the inside air by the second air-conditioning heat exchanger 25 and by returning it to the vehicle interior.

(Modification)

Next, a modification of the heat exchange system 30 of a first embodiment will be described.

Figure 13:
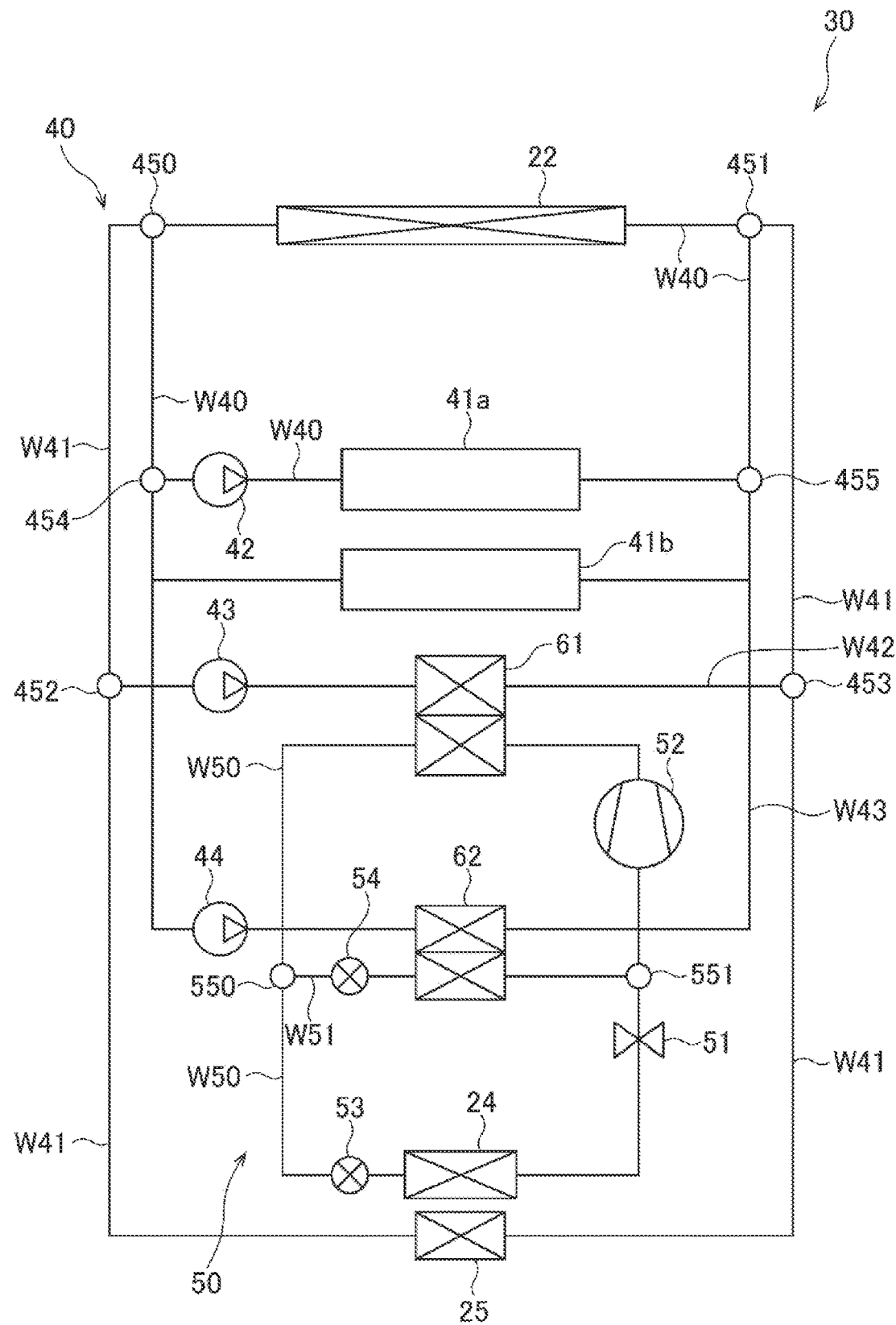
FIG. 13 is a block diagram illustrating a schematic configuration of a heat exchange system of a modification.

As illustrated in FIG. 13, the cooling system 40 of the present modification has a first heating element 41*a* and a second heating element 41*b* as heating elements to be cooled by the cooling water. The first heating element 41*a* is a motor generator or the like. The second heating element 41*b* is a battery. When the cooling system 40 has the first heating element 41*a* and the second heating element 41*b*, as described above, the heat exchange system 30 can be operated, for example, in each of the modes illustrated in FIGS. 14 to 21.

Next, details of each of the modes illustrated in FIGS. 14 to 21 will be described. Note that in FIGS. 14 to 21, a flow path through which the cooling water or the thermal medium is flowing is illustrated by a solid line, and a flow path through which neither the cooling water nor the thermal medium is flowing is illustrated by a broken line.

<First Heating Element Cooling Mode>

Figure 14:
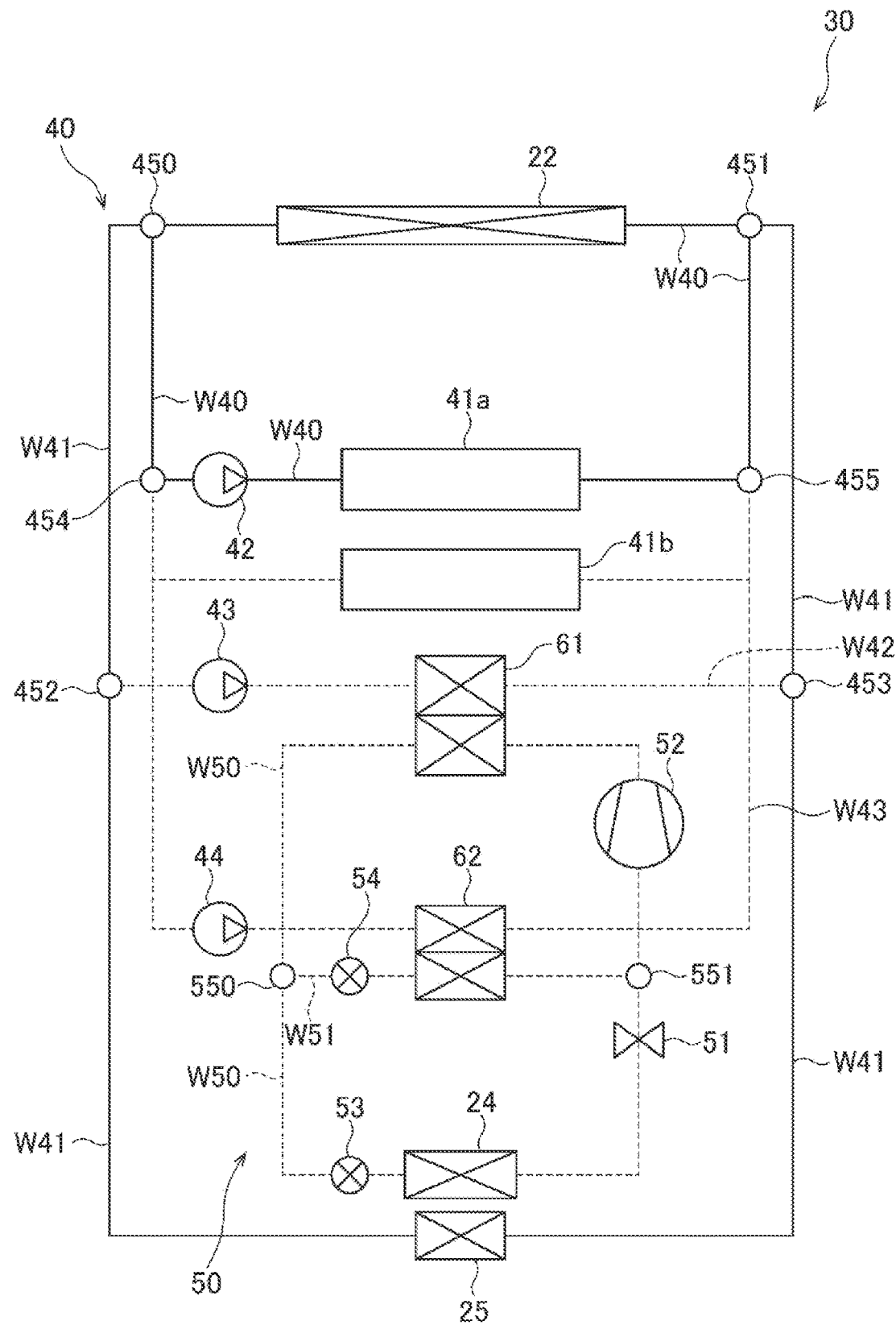
FIG. 14 is a block diagram illustrating an operation example of the heat exchange system in a first heating element cooling mode of the modification.

In this mode, the controller 70 circulates the cooling water in the cooling system 40, as illustrated by a solid line in FIG. 14. As a result, the cooling water cooled by the cooling heat exchanger 22 and the second air-conditioning heat exchanger 25 circulates through the first heating element 41*a*. As a result, the first heating element 41*a* is cooled.

<Second Heating Element Cooling Mode>

Figure 15:
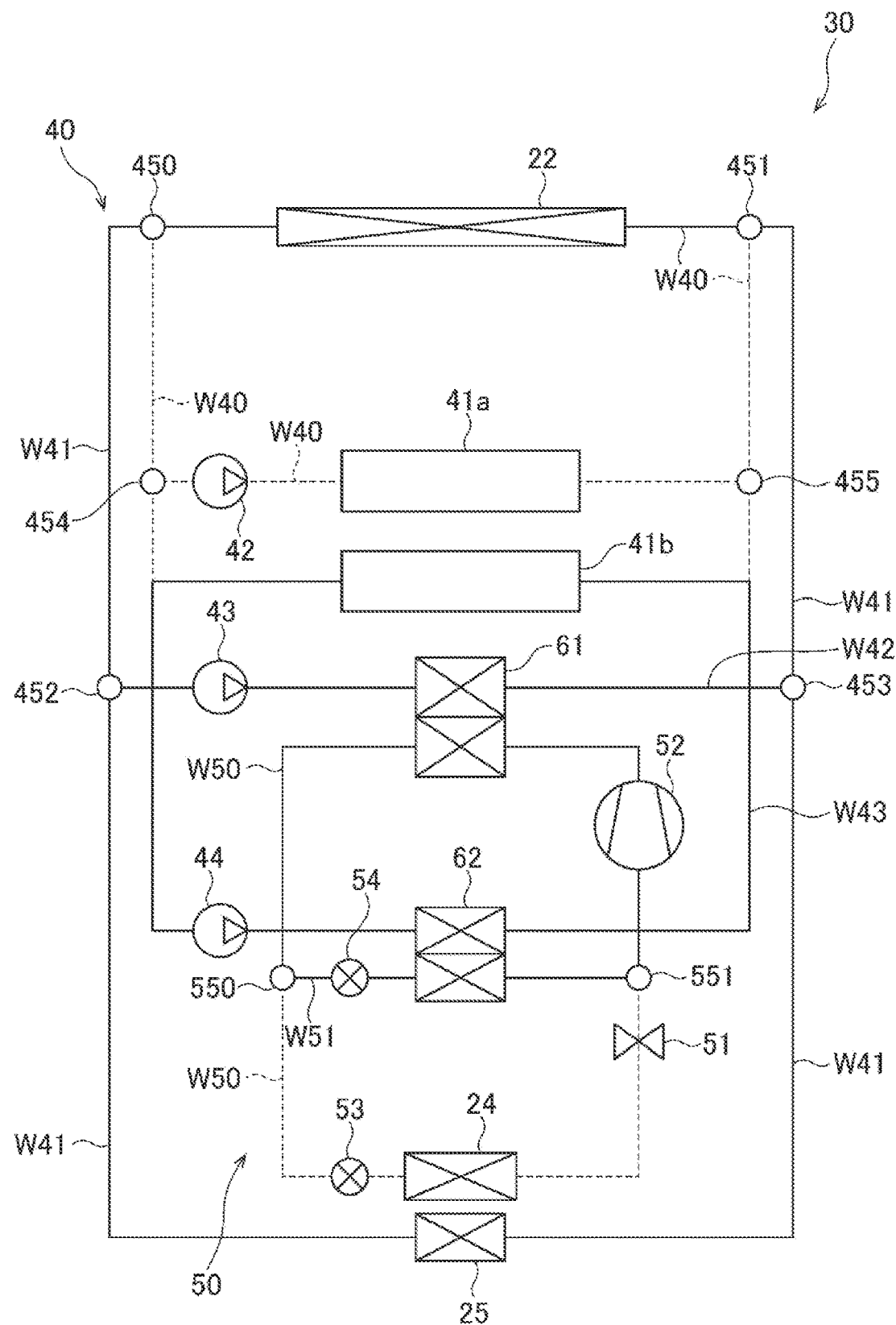
FIG. 15 is a block diagram illustrating an operation example of the heat exchange system in a second heating element cooling mode of the modification.

In this mode, the controller 70 circulates the cooling water and the thermal medium in each of the systems 40, 50, as illustrated by the solid lines in FIG. 15. As a result, in the first hydrothermal-medium heat exchanger 61, heat is exchanged between the cooling water cooled by the cooling heat exchanger 22 and the second air-conditioning heat exchanger 25, and the high-temperature and high-pressure gas-phase thermal medium discharged from the compressor 52, so that the heat of the thermal medium is absorbed by the cooling water. As a result, the thermal medium condenses. In the second hydrothermal-medium heat exchanger 62, heat is exchanged between the low-pressure liquid-phase thermal medium whose pressure has been reduced by the second expansion valve 54 and the cooling water. As a result, the cooling water is cooled. Therefore, in the heat pump system 50, the first hydrothermal-medium heat exchanger 61 substantially functions as a refrigerant condenser, and the second hydrothermal-medium heat exchanger 62 substantially functions as an evaporator. The cooling water cooled by the second hydrothermal-medium heat exchanger 62 circulates through the second heating element 41*b*, so that the second heating element 41*b* is cooled.

<First and Second Heating Elements Cooling Mode>

Figure 16:
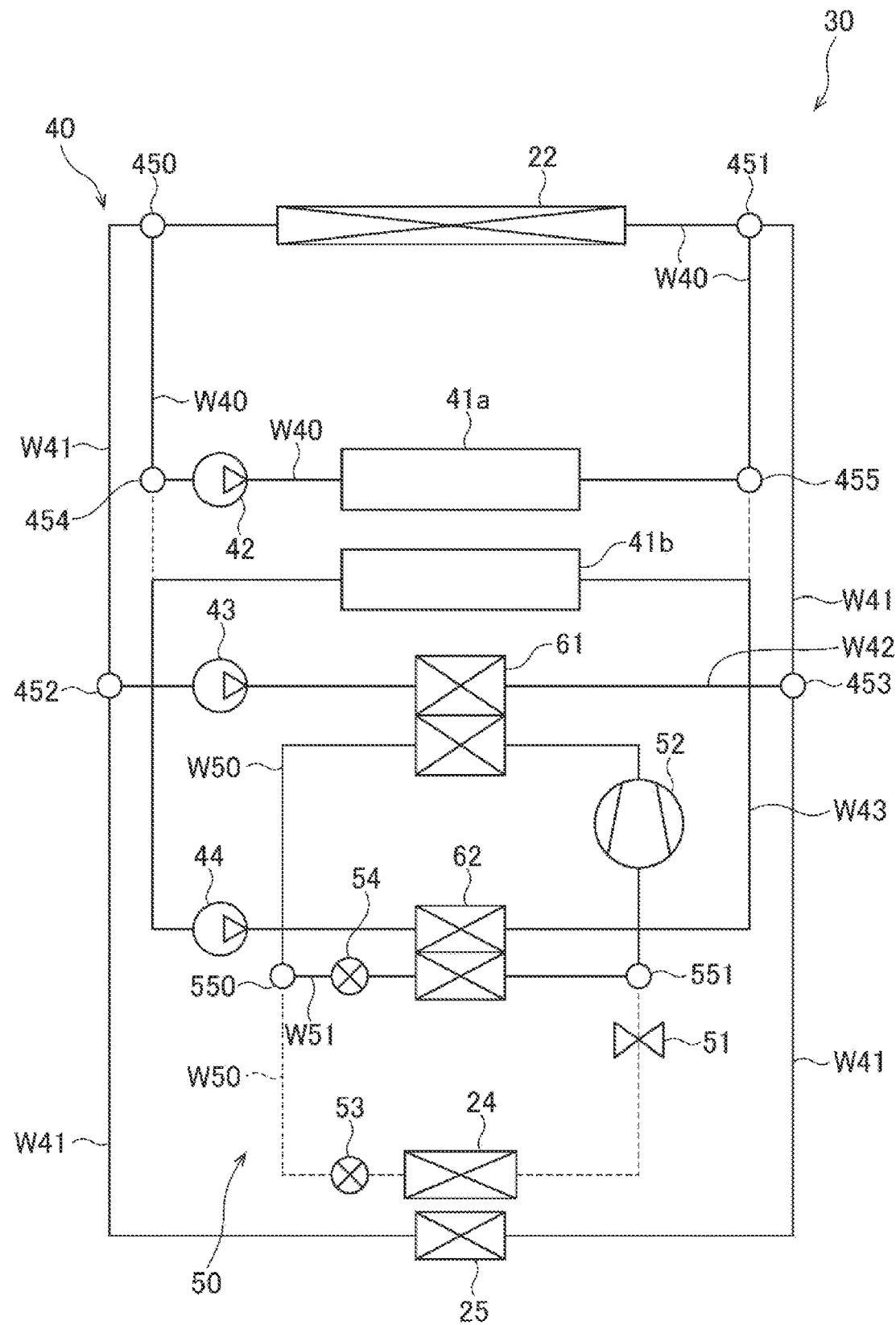
FIG. 16 is a block diagram illustrating an operation example of the heat exchange system in a first and second heating elements cooling mode of the modification.

In this mode, the controller 70 circulates the cooling water and the thermal medium in each of the systems 40, 50, as illustrated by the solid lines in FIG. 16. As illustrated in FIG. 16, the flows of the cooling water and the thermal medium in the present mode are those in which the flow of the cooling water in the first heating element cooling mode illustrated in FIG. 14 and the flows of the cooling water and the thermal medium in the second heating element cooling mode illustrated in FIG. 15 are combined. Therefore, in the first and second heating elements cooling mode, both the first heating element 41*a* and the second heating element 41*b* are cooled.

<First and Second Heating Elements Cooling-Cooling Mode>

Figure 17:
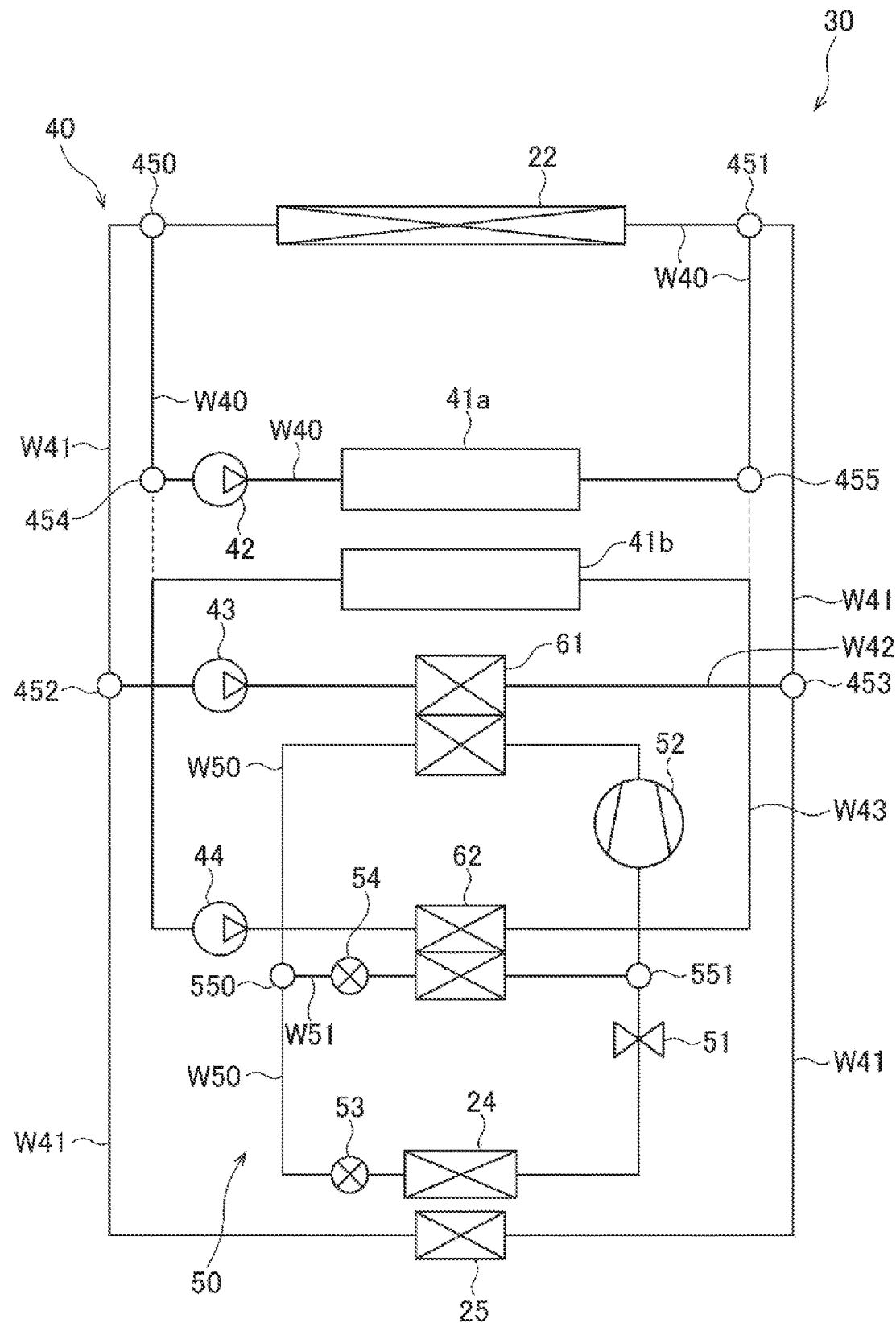
FIG. 17 is a block diagram illustrating an operation example of the heat exchange system in a first and second heating elements cooling-cooling mode of the modification.

In this mode, the controller 70 circulates the cooling water and the thermal medium in each of the system 40, 50, as illustrated by the solid lines in FIG. 17. As illustrated in FIG. 17, the flows of the cooling water and the thermal medium in the present mode are those in which the flow of the thermal medium through the first air-conditioning heat exchanger 24 is further added to the flows of the cooling water and the thermal medium in the first and second heating elements cooling mode illustrated in FIG. 16. When the thermal medium flows through the first air-conditioning heat exchanger 24, the first air-conditioning heat exchanger 24 functions as an evaporator. As a result, the air-conditioning air is cooled. Therefore, the first and second heating elements cooling-cooling mode is a mode for cooling both the first heating element 41*a* and the second heating element 41*b* and for further cooling the vehicle interior.

<First Heating Mode>

Figure 18:
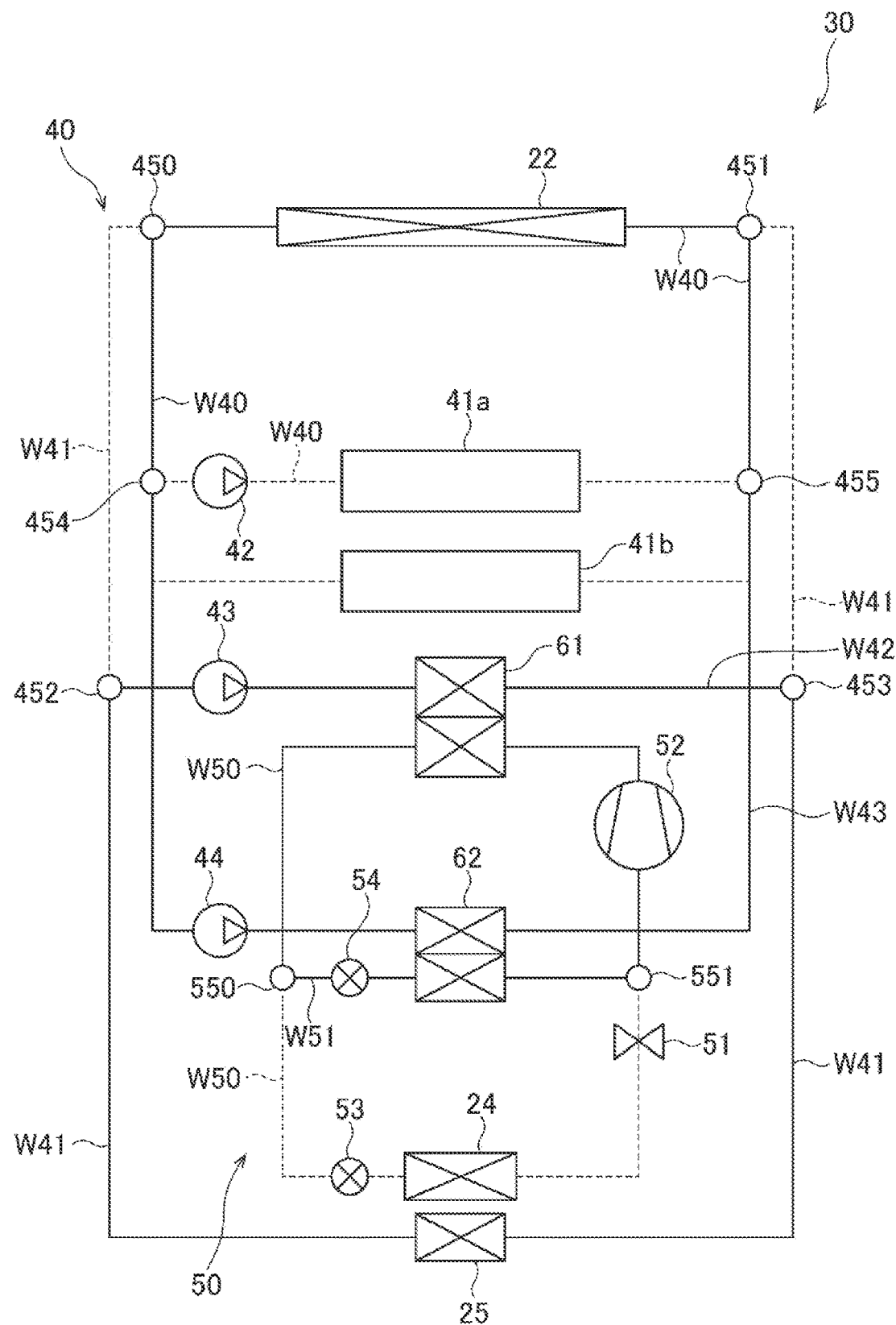
FIG. 18 is a block diagram illustrating an operation example of the heat exchange system in a first heating mode of the modification.

In this mode, the controller 70 circulates the cooling water and the thermal medium in each of the systems 40, 50, as illustrated by the solid lines in FIG. 18. As illustrated in FIG. 18, the flows of the cooling water and the thermal medium in the present mode are the same as those in the heating mode illustrated in FIG. 9. Therefore, the first heating mode is a mode for heating the vehicle interior by using the heat of outside air.

<Second Heating Mode>

Figure 19:
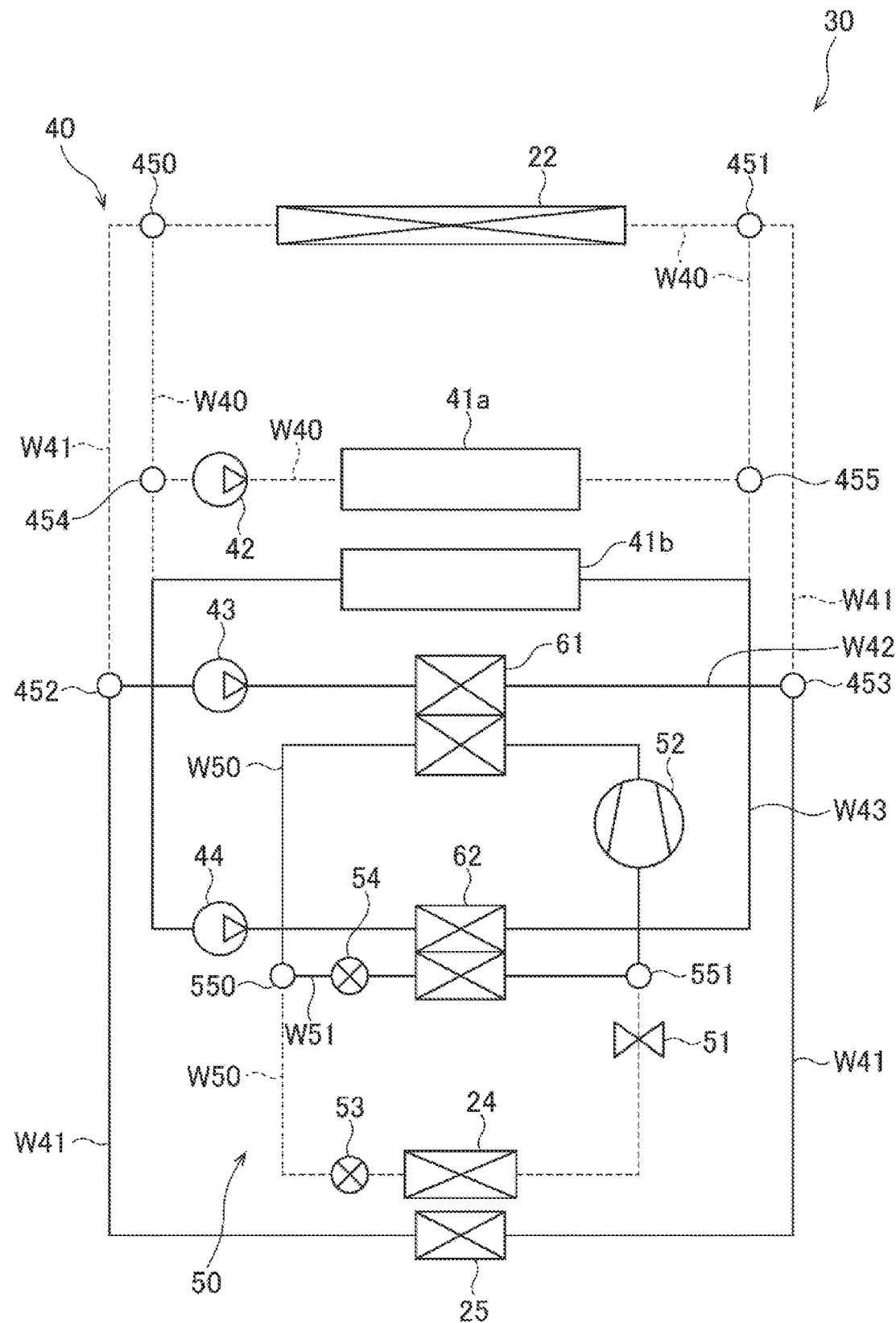
FIG. 19 is a block diagram illustrating an operation example of the heat exchange system in a second heating mode of the modification.

In this mode, the controller 70 circulates the cooling water and the thermal medium in each of the systems 40, 50, as illustrated by the solid lines in FIG. 19. As illustrated in FIG. 19, the flows of the cooling water and the thermal medium in the present mode are those in which in the flows in the first heating mode illustrated in FIG. 18, the cooling water is made to flow through the second heating element 41*b*, instead of the cooling heat exchanger 22. Therefore, the second heating mode is a mode for heating the vehicle interior by using the heat of the second heating element 41*b*.

<First Heating-Dehumidification Mode>

Figure 20:
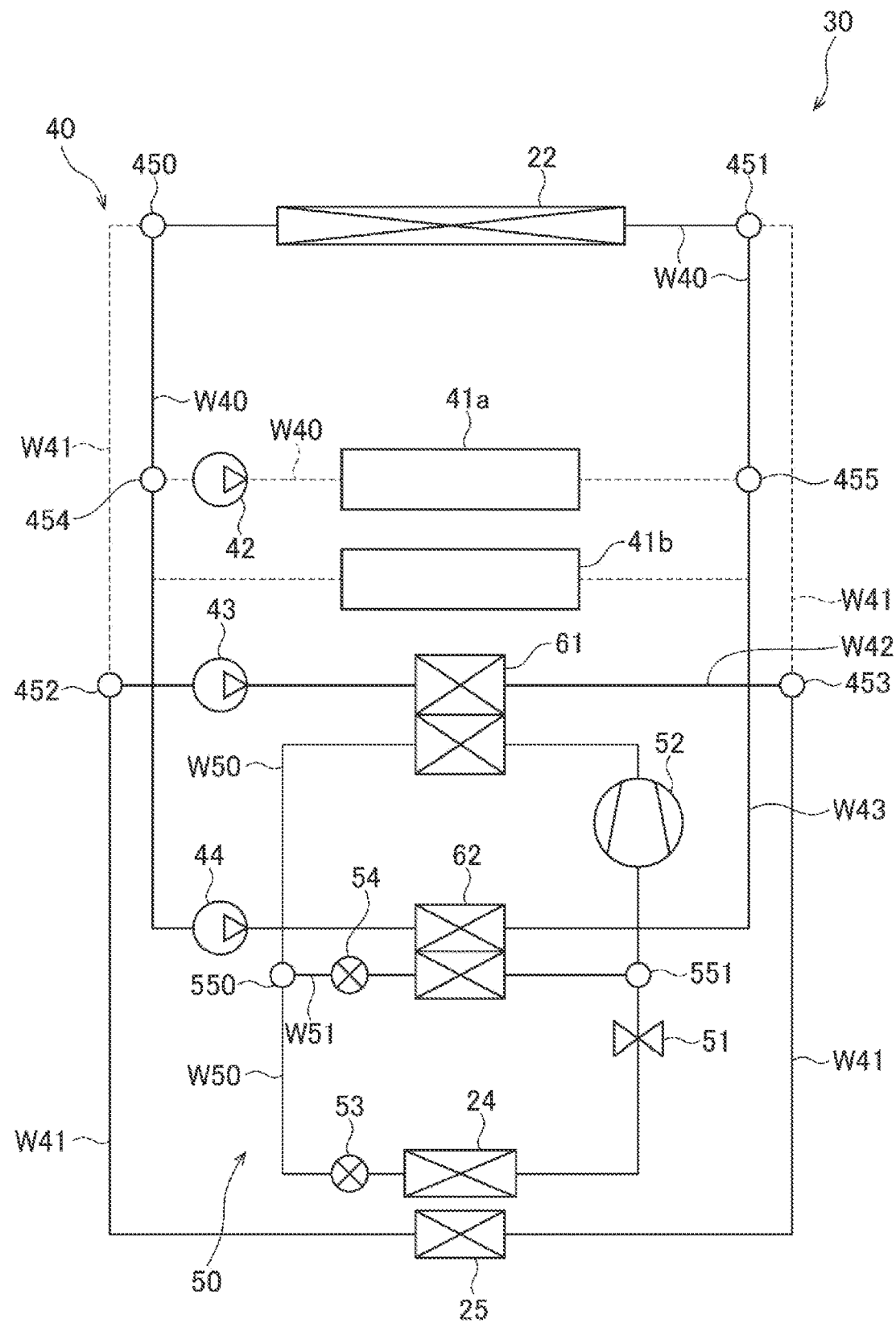
FIG. 20 is a block diagram illustrating an operation example of the heat exchange system in a first heating-dehumidification mode of the modification.

In this mode, the controller 70 circulates the cooling water and the thermal medium in each of the systems 40, 50, as illustrated by the solid lines in FIG. 20. As illustrated in FIG. 20, the flows of the cooling water and the thermal medium in the present mode are those in which in the flows in the first heating mode illustrated in FIG. 18, the thermal medium is further made to flow through the first air-conditioning heat exchanger 24. When the thermal medium flows through the first air-conditioning heat exchanger 24, the first air-conditioning heat exchanger 24 functions as an evaporator. As a result, the air-conditioning air is dehumidified. Therefore, the first heating-dehumidification mode is a mode for heating and dehumidifying the vehicle interior.

<Second Heating-Dehumidification Mode>

Figure 21:
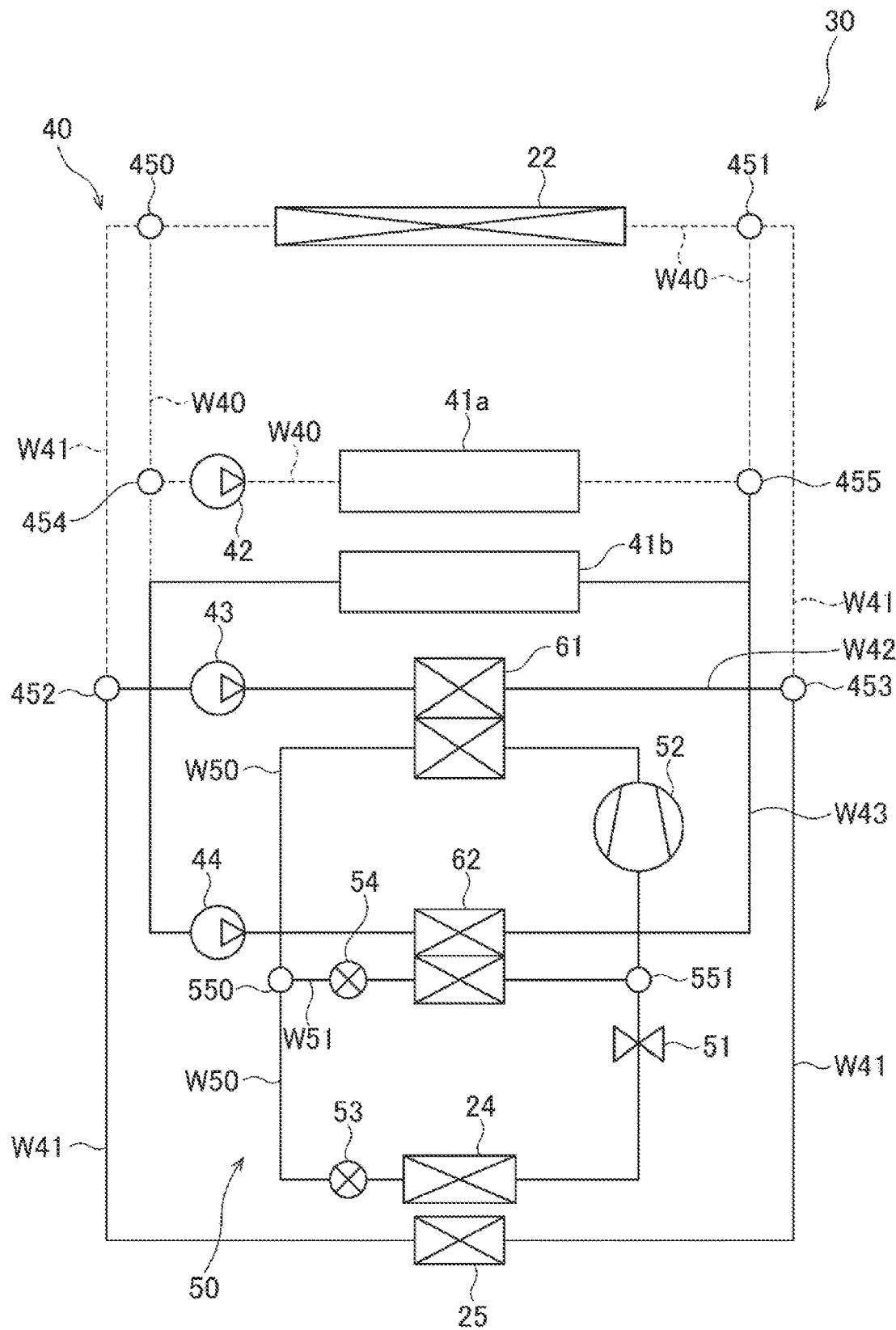
FIG. 21 is a block diagram illustrating an operation example of the heat exchange system in a second heating-dehumidification mode of the modification.

In this mode, the controller 70 circulates the cooling water and the thermal medium in each of the systems 40 and 50, as illustrated by the solid lines in FIG. 21. As illustrated in FIG. 21, the flows of the cooling water and the thermal medium in the present mode are those in which in the flows in the second heating mode illustrated in FIG. 19, the thermal medium is further made to flow through the first air-conditioning heat exchanger 24. When the thermal medium flows through the first air-conditioning heat exchanger 24, the first air-conditioning heat exchanger 24 functions as an evaporator. As a result, the air-conditioning air is dehumidified. Therefore, the first heating-dehumidification mode is a mode for heating and dehumidifying the vehicle interior.

Other Embodiments

The above embodiment can also be carried out in the following embodiments.

In the heating mode, the cooling heat exchanger 22 may absorb heat from the outside air by opening the cooling-side vehicle interior-exterior communication port 214*a* instead of the cooling-side vehicle interior-interior communication port 215*a*. Alternatively, the cooling heat exchanger 22 may absorb heat from the outside air introduced from the cooling-side outside air inlet 210*a* by opening the cooling-side outside air inlet 210*a* instead of the cooling-side vehicle interior-exterior communication port 214*a*. Specifically, in the heating mode, the controller 70 opens the cooling-side outside air inlet 210*a*, the air-conditioning-side outside air inlet 210*b*, the cooling-side vehicle interior-exterior communication port 214*a*, and the air-conditioning-side vehicle interior-interior communication port 215*b*, and closes the air-conditioning-side vehicle interior-exterior communication port 214*b*, the cooling-side vehicle interior-interior communication port 215*a*, and the communication passage 216. As a result, in the cooling passage 211, the cooling heat exchanger 22 can absorb heat from the outside air flowing from the cooling-side outside air inlet 210*a* toward the cooling-side vehicle interior-exterior communication port 214*a*. In the air conditioning passage 212, the outside air introduced from the air-conditioning-side outside air inlet 201*b* is heated by the second air-conditioning heat exchanger 25, and then flows through the air-conditioning-side vehicle interior-interior communication port 215*b*. As a result, the vehicle interior can be heated. Similarly, in the frost protection mode, the cooling heat exchanger 22 may absorb heat from the outside air instead of the inside air.

Figure 22:
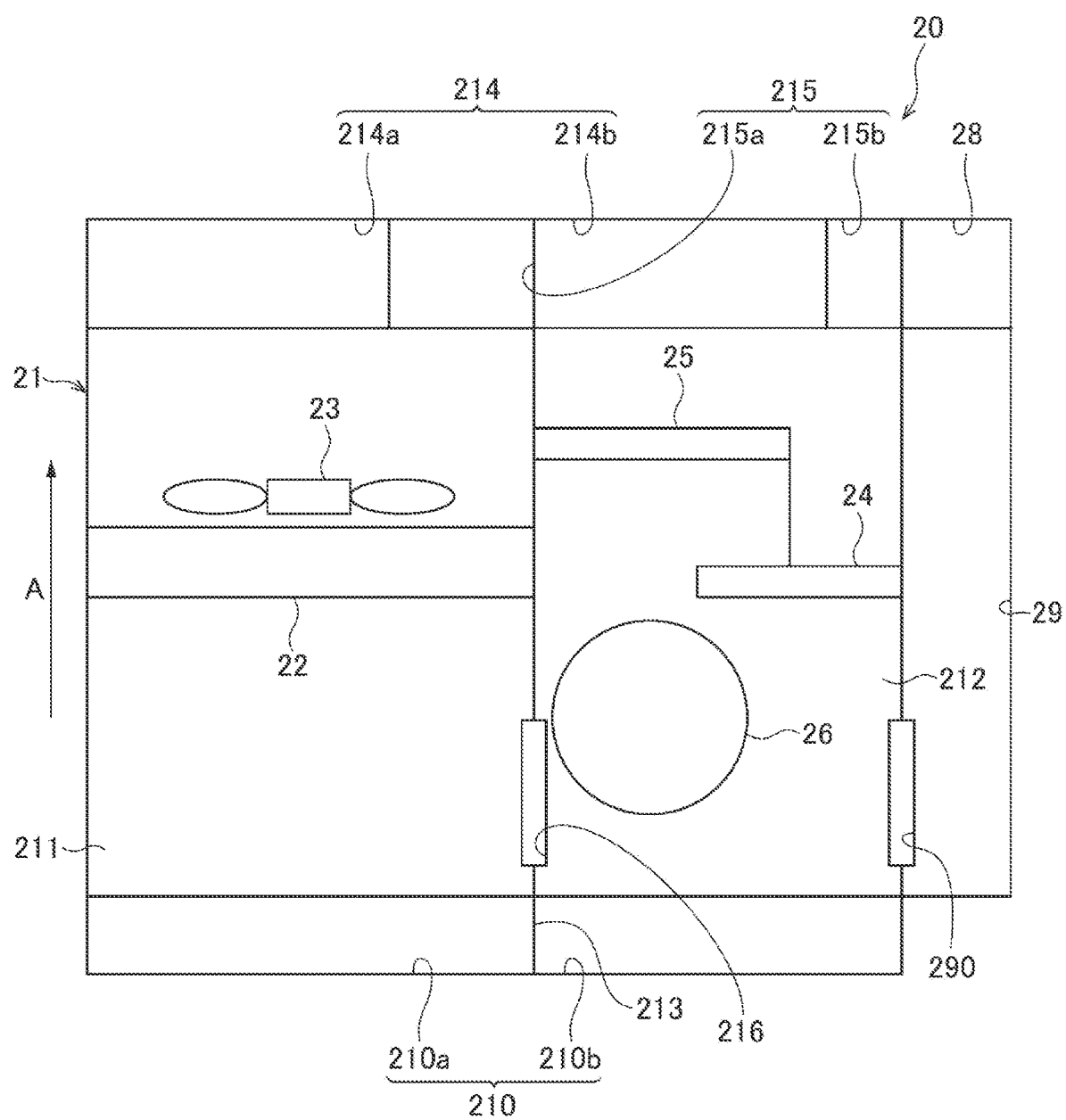
FIG. 22 is a diagram schematically illustrating a structure of a heat exchange module of another embodiment.

As illustrated in FIG. 22, the heat exchange module 20 may further include an inside air inlet 28 for introducing air in the vehicle interior, an inside air passage 29 for guiding the inside air introduced from the inside air inlet 28 to a portion on the upstream side of the second blower 26 in the air conditioning passage 212, a communication passage 290 for communicating the inside air passage 29 and the air conditioning passage 212, and a door member for opening and closing the communication passage 290. According to this configuration, a so-called inside air circulation mode can be realized, for example, in the heating element cooling-cooling mode, by introducing inside air from the inside air inlet 28 instead of the air-conditioning-side outside air inlet 210*b*.

Figure 23:
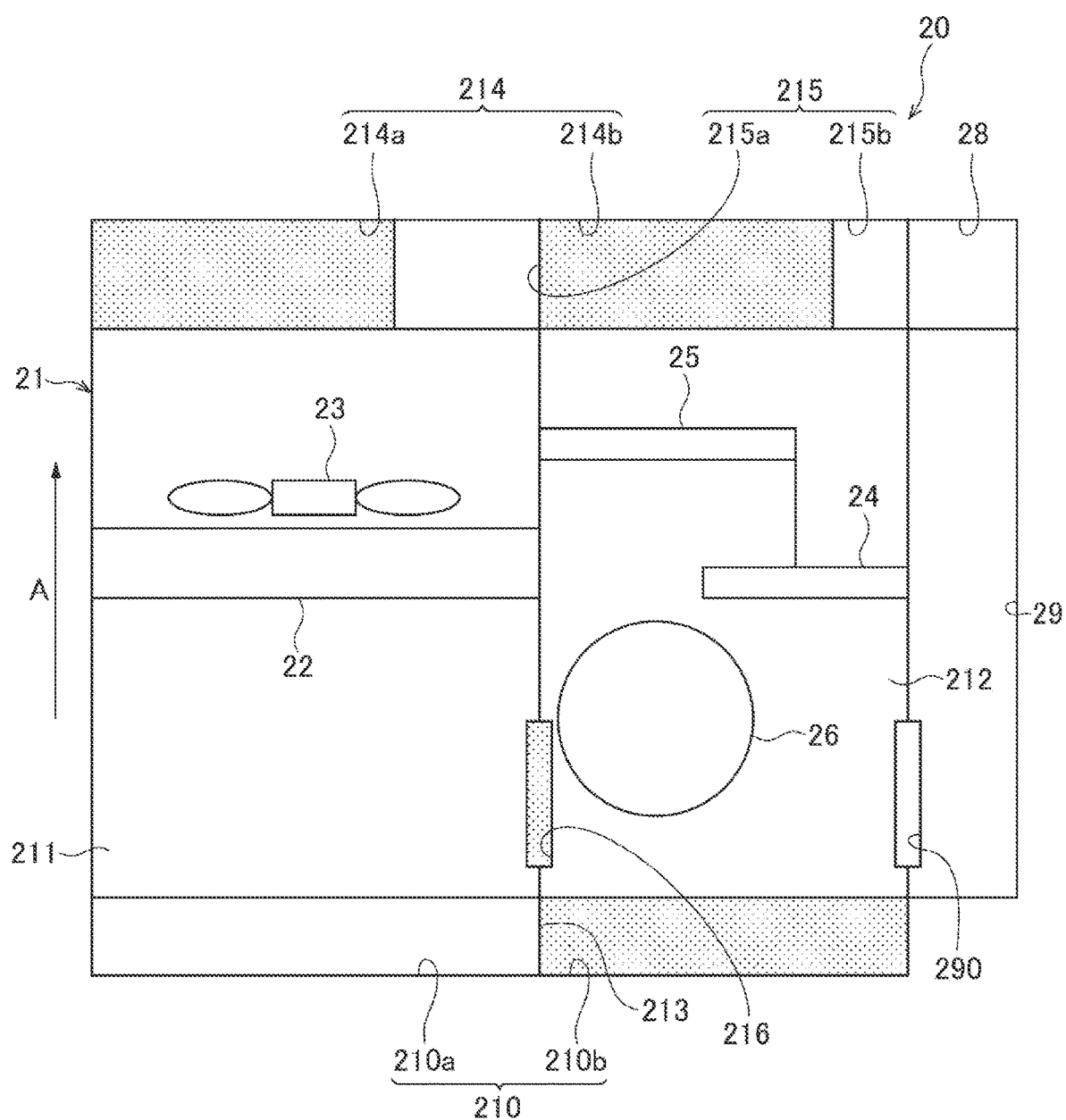
FIG. 23 is a diagram schematically illustrating an operation example of the heat exchange module of the other embodiment.

In the heating mode and the frost protection mode, the inside air whose heat has been dissipated in the cooling heat exchanger 22 may be discharged outside the vehicle interior. For example, when the heat exchange module 20 as illustrated in FIG. 22 is used, the inside air whose heat has been dissipated in the cooling heat exchanger 22 can be discharged outside the vehicle interior by opening the cooling-side outside air inlet 210*a*, the cooling-side vehicle interior-interior communication port 215*a*, the air-conditioning-side vehicle interior-interior communication port 215*b*, and the inside air inlet 28, and by closing the air-conditioning-side outside air inlet 210*b*, the cooling-side vehicle interior-exterior communication port 214*a*, the air-conditioning-side vehicle interior-exterior communication port 214*b*, and the communication passage 216, as illustrated in FIG. 23.

In the heating element cooling mode and the heating element cooling-cooling mode, the controller 70 may determine whether to use the second air-conditioning heat exchanger 25 as a radiator depending on the load state of the heating element 41. Specifically, when the load of the heating element 41 is large in the heating element cooling mode and the heating element cooling-cooling mode, the controller 70 determines that the temperature of the heating element 41 is likely to rise, and the second air-conditioning heat exchanger 25 is used as a radiator. On the other hand, when the load of the heating element 41 is small in the heating element cooling mode and the heating element cooling-cooling mode, the controller 70 determines that the temperature of the heating element 41 is unlikely to rise, and the second air-conditioning heat exchanger 25 may not be used as a radiator.

Based on the fact that frost is actually formed on the cooling heat exchanger 22, the controller 70 may execute the frost protection mode.

The case 21 may be provided with the cooling-side outside air inlet 210*a* and the air-conditioning-side outside air inlet 210*b* that are separate from each other. Alternatively, the case 21 may be provided with the cooling passage 211 and the air conditioning passage 212 that are separate from each other. The heat exchange module 20 may have a structure in which a cooling unit corresponding to the cooling passage 211 and an air conditioning unit corresponding to the air conditioning passage 212 are independently disposed.

The case 21 may be provided with the cooling passage 211 and the air conditioning passage 212 that are spaced apart from each other.

The vehicle interior-exterior communication port 214 may be a portion that discharges air to a place other than the outside of the vehicle interior, such as a motor room in which a motor generator is provided or an engine room in which an internal combustion engine is provided.

The outside air inlet 210 may be, for example, a portion that introduces outside air from the front or underfloor of the vehicle 10 without being limited to the hood 11.

The heat exchange module 20 may be a structure that has one blower common to the cooling passage 211 and the air conditioning passage 212.

When the cooling passage 211 and the air conditioning passage 212 are formed in a partitioned manner inside the case 21, the outside air inlet 210 and the vehicle interior-exterior communication port 214 may not be partitioned by the partition wall 213.

Instead of the second air-conditioning heat exchanger 25 that functions as a heater core, an air-heating type positive temperature coefficient (PTC) heater may be used.

The case 21 may not be provided with the partition wall 213. That is, the cooling passage 211 and the air conditioning passage 212 may not be formed to be separate from each other.

The heat exchange module 20 may be one that introduces outside air by driving the blowers 23, 26 while the vehicle 10 is being stopped, for example, while the vehicle 10 is being charged, while the vehicle 10 is waiting at a traffic light, or the like, without being limited to one that introduces the running wind of the vehicle 10 as outside air.

The heat pump system 50 may be one that operates only as a refrigeration cycle for cooling the air-conditioning air. In this case, it is not necessary to execute the heating mode and the frost protection mode, so that the communication passage 216 may not be formed in the case 21.

The vehicle 10 may be an engine vehicle that travels by the power of an internal combustion engine, or a hybrid vehicle that travels by the power of each of an electric motor and an internal combustion engine, without being limited to an electric vehicle. In the engine vehicle, the internal combustion engine is a heating element. In the hybrid vehicle, a battery that supplies power to the electric motor and the internal combustion engine are heating elements.

The present disclosure is not limited to the above specific examples. Those obtained by adding appropriate design changes to the above specific examples, by those skilled in the art, are also included in the scope of the present disclosure as long as they have the characteristics of the present disclosure. The respective elements included in the respective specific examples described above, and their arrangements, conditions, shapes, and the like can be appropriately changed without being limited to those described as examples. The respective elements included in the respective specific examples described above can be appropriately changed in combination, unless there is a technical conflict.

What is claimed is:

1. A vehicle heat exchange system comprising:
a cooling heat exchanger provided in a cooling water circuit in which cooling water for cooling a heating element of a vehicle circulates, and configured to exchange heat between air flowing through a cooling passage and the cooling water;
a first air-conditioning heat exchanger configured to operate as an evaporator in a heat pump system, and configured to cool air for air conditioning a vehicle interior by exchanging heat between the air and a thermal medium circulating in the heat pump system;
a first hydrothermal-medium heat exchanger configured to operate as a refrigerant condenser in the heat pump system, and configured to cool the thermal medium by exchanging heat between the thermal medium circulating in the heat pump system and the cooling water;
a second air-conditioning heat exchanger in which the cooling water, which has absorbed heat of the thermal medium in the first hydrothermal-medium heat exchanger, flows, the second air-conditioning heat exchanger being configured to heat the air by exchanging heat between the cooling water and the air;
a second hydrothermal-medium heat exchanger configured to heat the thermal medium by exchanging heat between the cooling water for cooling the heating element and the thermal medium circulating in the heat pump system;
an air conditioning passage in which the first air-conditioning heat exchanger and the second air-conditioning heat exchanger are disposed, the air conditioning passage being configured to guide the air, which has passed through the first air-conditioning heat exchanger and the second air-conditioning heat exchanger, into the vehicle interior; and
a vehicle interior-exterior communication port provided at a downstream side of the second air-conditioning heat exchanger in the air conditioning passage, to guide the air, which has passed through the second air-conditioning heat exchanger, to an outside of the vehicle interior, wherein
the cooling water circuit is configured to cause the cooling water for cooling the heating element to flow through the second air-conditioning heat exchanger, and the vehicle interior-exterior communication port is configured to cause the air that has passed through the second air-conditioning heat exchanger to be discharged outside the vehicle interior through the vehicle interior-exterior communication port, and
the cooling water circuit is configured to cause the cooling water, which has absorbed the heat of the thermal medium in the first hydrothermal-medium heat exchanger to flow through the second air-conditioning heat exchanger when the first air-conditioning heat exchanger is not operating as an evaporator and the second hydrothermal-medium heat exchanger is operating as an evaporator in the heat pump system.

2. The vehicle heat exchange system according to claim 1, further comprising
a frosted-state detector configured to detect a frosted state of the cooling heat exchanger, wherein
the heat pump system is configured to switch a first state in which the first air-conditioning heat exchanger is operated as an evaporator and a second state in which the second hydrothermal-medium heat exchanger is operated as an evaporator, depending on the frosted state of the cooling heat exchanger, and
when the first air-conditioning heat exchanger is operating as an evaporator, the first hydrothermal-medium heat exchanger operates as a refrigerant condenser, so that the cooling water, which has absorbed the heat of the thermal medium in the first hydrothermal-medium heat exchanger, flows through the second air-conditioning heat exchanger, and the cooling water circulates between the heating element and the cooling heat exchanger.

3. The vehicle heat exchange system according to claim 1, further comprising
a cooling-side outside air inlet configured to introduce outside air, air outside the vehicle, into the cooling passage, at an upstream side of the cooling heat exchanger in the cooling passage, wherein the vehicle interior-exterior communication port is an air-conditioning-side vehicle interior-exterior communication port provided in the air conditioning passage, the cooling passage is provided respectively with a first cooling-side communication port communicating with the outside of the vehicle interior, and a second cooling-side communication port communicating with the vehicle interior, at a downstream side of the cooling heat exchanger, the cooling passage is provided with a blower rotatable with a first rotation direction to blow an air flow flowing from the cooling-side outside air inlet toward the first cooling-side communication port in a first mode, and the blower is rotatable with a second rotation direction opposite with the first rotation direction, to introduce inside air, inside of the vehicle interior, into the cooling passage from the second cooling-side communication port in a second mode.

4. The vehicle heat exchange system according to claim 3, further comprising:

a first opening-closing unit configured to open and close the cooling-side outside air inlet; and a second opening-closing unit configured to open and close the cooling-side first communication port.

5. The vehicle heat exchange system according to claim 3, wherein in the second mode, the inside air introduced into the cooling passage from the second cooling-side communication port passes through the cooling heat exchanger, and then flows through the second air-conditioning heat exchanger.

6. The vehicle heat exchange system according to claim 3, wherein in the second mode, the inside air introduced into the cooling passage from the second cooling-side communication port passes through the cooling heat exchanger, and then is discharged outside the vehicle interior.

* * * * *